United States Patent
Kiyoshige

(10) Patent No.: US 8,259,186 B2
(45) Date of Patent: Sep. 4, 2012

(54) COMMUNICATION TERMINAL THAT SHARES ELECTRONIC DATA WITH OTHER COMMUNICATION TERMINALS

(75) Inventor: Ryuichi Kiyoshige, Yokohama (JP)

(73) Assignee: Olympus Corporation, Tokyo (JP)

( * ) Notice: Subject to any disclaimer, the term of this patent is extended or adjusted under 35 U.S.C. 154(b) by 78 days.

(21) Appl. No.: 12/817,712

(22) Filed: Jun. 17, 2010

(65) Prior Publication Data

US 2011/0013025 A1      Jan. 20, 2011

(30) Foreign Application Priority Data

Jul. 14, 2009   (JP) .................... 2009-165856

(51) Int. Cl.
*H04N 5/232*        (2006.01)

(52) U.S. Cl. ................................. 348/211.99

(58) Field of Classification Search ............. 348/211.99, 348/211.1–211.3
See application file for complete search history.

(56) References Cited

U.S. PATENT DOCUMENTS

| | | | |
|---|---|---|---|
| 8,004,593 B2* | 8/2011 | Kusaka | 348/333.02 |
| 2001/0022624 A1* | 9/2001 | Tanaka et al. | 348/333.02 |
| 2004/0183915 A1* | 9/2004 | Gotohda et al. | 348/207.11 |
| 2004/0201744 A1* | 10/2004 | Akasawa | 348/231.6 |
| 2006/0165405 A1* | 7/2006 | Kanai et al. | 396/334 |
| 2007/0285523 A1* | 12/2007 | Ward et al. | 348/211.3 |

FOREIGN PATENT DOCUMENTS

JP      2007-13704 A      1/2007

* cited by examiner

*Primary Examiner* — Kelly L Jerabek

(74) *Attorney, Agent, or Firm* — Westerman, Hattori, Daniels & Adrian, LLP

(57) ABSTRACT

A communication terminal comprises a storage unit, a selection unit, and a communication unit. The storage unit stores electronic data and condition information indicating a selection condition of the electronic data. The selection unit selects the electronic data from among the electronic data stored in the storage unit and the electronic data indicated by possession information indicating the electronic data possessed by other communication terminals joining data sharing based on the condition information. The communication unit receives the possession information from the other communication terminals between a first timing and a second timing when the selection unit selects the electronic data.

28 Claims, 17 Drawing Sheets

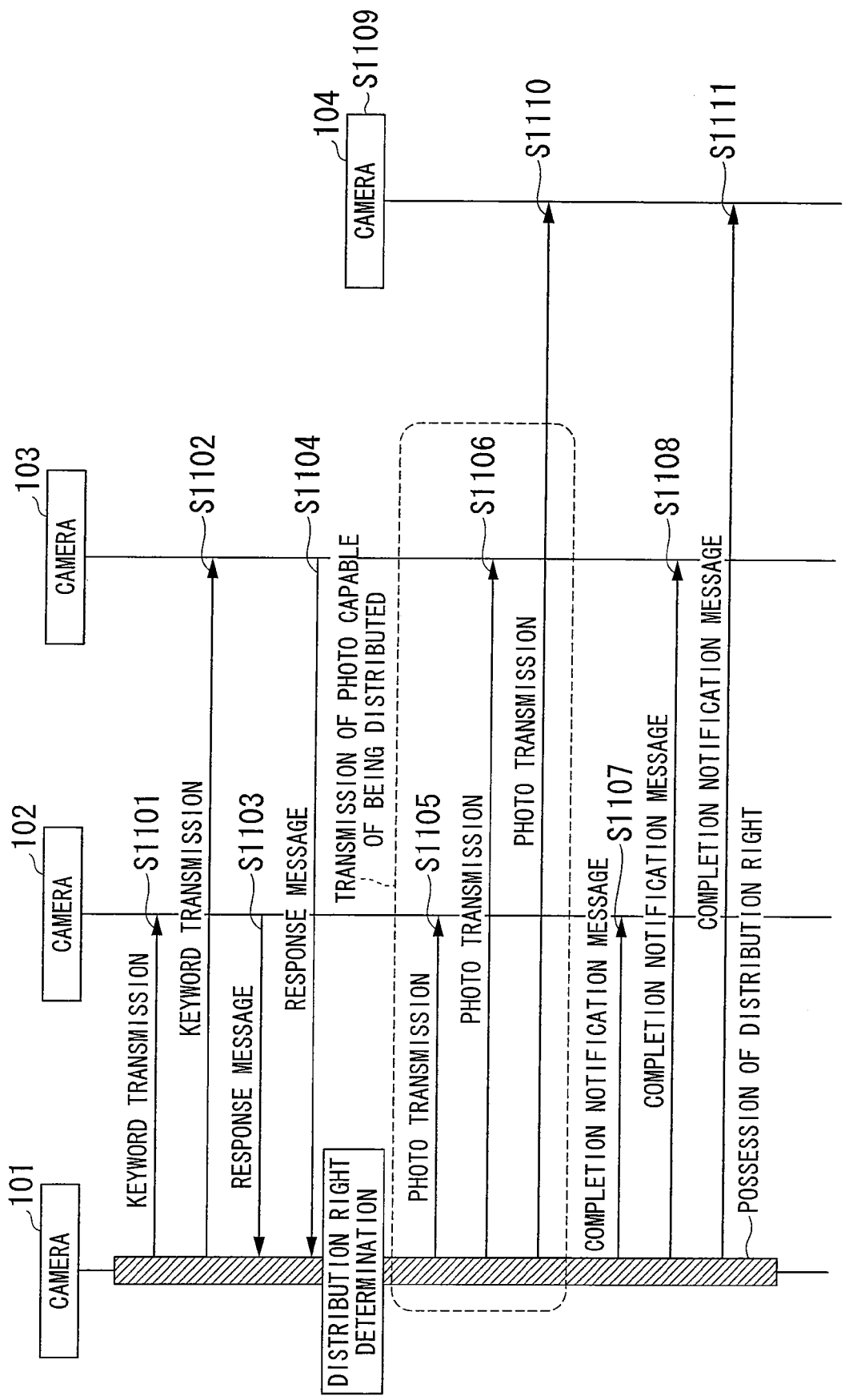

COMMUNICATION TERMINAL THAT SHARES ELECTRONIC DATA WITH OTHER COMMUNICATION TERMINALS

BACKGROUND OF THE INVENTION

1. Field of the Invention

The present invention relates to a communication terminal which has a communication function and shares electronic data with other communication terminals.

Priority is claimed on Japanese Patent Application No. 2009-165856, filed Jul. 14, 2009, the content of which is incorporated herein by reference.

2. Description of Related Art

When families or friends go to an event such as a field trip or an athletic meet, they often take commemorative photos. At the time of desiring to view photos taken by someone else, it is possible to share photos by viewing a play mode screen of a camera of another person or by receiving photos transmitted to one's own terminal through communication between two parties using a communication means capable of performing communication between terminals such as infrared communication even in an environment where no communication infrastructure exists. However, a troublesome operation is necessary and photos are shared only one by one. A method of sharing and simultaneously playing content such as photos between multiple terminals has been proposed (for example, Japanese Unexamined Patent Application, First Publication No. 2007-13704).

SUMMARY OF THE INVENTION

A communication terminal may include: a storage unit that stores contents, condition information deciding play order of the contents, and additional information of the contents; a communication unit that wirelessly transmits the condition information, which has been stored by the storage unit, to other communication terminals that joins a network, the communication unit wirelessly receiving additional information of contents, which have been stored by the other communication terminals, from the other communication terminals as a response of the condition information that has been wirelessly transmitted to the other communication terminals; and a selection unit that compares the additional information of the contents, which have been stored by the storage unit, with the additional information, which has been stored by the other communication terminals and wirelessly received by the communication unit, so as to select contents suitable for the condition information, which has been stored by the storage unit, from among the contents, which have been stored by the storage unit, and the contents, which have been stored by the other communication terminals. If the selection unit selects the contents that have been stored by the storage unit, then the communication unit wirelessly transmits the contents, which have been selected, to the other communication terminals. If the selection unit selects the contents that have been stored by the other communication terminals, then the communication unit wirelessly transmits a message for wirelessly transmitting the contents, which have been selected, to the other communication terminals that stores the contents that have been selected.

Preferably, the communication unit wirelessly transmits the contents, which have been stored by the storage unit, to the other communication terminals only when a distribution right of the contents is given.

Preferably, the communication unit wirelessly transmits the condition information, which has been stored by the storage unit, to the other communication terminals only when the distribution right of the contents is given.

Preferably, the communication terminal may further comprise: a distribution determination unit that determines to shift the distribution right to the other communication terminals that stores the contents, which have been selected, if the distribution right of the contents is given and the contents, which have been stored by the other communication terminals, are selected by the selection unit.

Preferably, the communication terminal may further comprise: a distribution determination unit that determines not to shift the distribution right to the other communication terminals if the distribution right of the contents is given and the contents, which have been stored by the storage unit, are selected by the selection unit.

Preferably, the communication terminal may further comprise: a distribution determination unit that determines that the distribution right is given if a prescribed declaration report is wirelessly transmitted to the other communication terminals and the prescribed declaration report from the other communication terminals is not received in a prescribed terminals after joining the network.

Preferably, the communication terminal may further comprise: a distribution determination unit that determines that the distribution right is given if a prescribed declaration report is wirelessly transmitted to the other communication terminals and the prescribed declaration report is wirelessly received from the other communication terminals after joining the network and if a declaration time in accordance with a declaration report, which has been wirelessly received, is after the declaration time in accordance with the declaration report, which has been wirelessly transmitted.

Preferably, the communication unit transmits the contents, which have been stored by the storage unit, to the other communication terminals by multicast.

Preferably, the communication terminal may further comprise: a display unit that displays the contents that have been wirelessly transmitted by the communication unit.

Preferably, the communication unit wirelessly receives the contents, which have been wirelessly transmitted by the other communication terminals that is a wireless transmission destination of the message.

Preferably, the communication unit wirelessly receives the contents, which have been wirelessly transmitted by the other communication terminals, by multicast.

Preferably, the communication terminal may further comprise: a display unit that displays the contents that have been wirelessly received by the communication unit.

Preferably, the communication unit wirelessly receives the condition information and the contents, which have been stored by the other communication terminals, from the other communication terminals, the selection unit retrieves the contents suitable for the condition information, which has been wirelessly received, from the contents that is stored by the storage unit, and if the selection unit retrieves the contents suitable for the condition information that has been wirelessly received, then the communication unit wirelessly transmits the additional information of the contents, which have been retrieved by the selection unit, to the other communication terminals as a response of the condition information that has been wirelessly received.

Preferably, the communication unit wirelessly receives a message for wirelessly transmitting the contents, which have been stored by the storage unit, from the other communication terminals that is a wireless transmission destination of the additional information, and the communication unit wirelessly transmits the contents, which have been stored by the storage unit, to the other communication terminals after the message is wirelessly received.

Preferably, the communication unit wirelessly receives the condition information from the other communication terminals by multicast.

Preferably, only when a distribution right of the contents is given, the communication unit wirelessly transmits the contents, which have been stored by the storage unit, to the other communication terminals, and only when the distribution right is not given, if the communication unit wirelessly receives the condition information and the contents, which have been stored by the other communication terminals, from the other communication terminals, and the selection unit retrieves the contents suitable for the condition information, then the communication unit wirelessly transmits the additional information of the contents, which have been retrieved by the selection unit, to the other communication terminals as a response to the condition information, which has been wirelessly received.

Preferably, the communication unit wirelessly transmits the contents, which have been stored by the storage unit, to the other communication terminals only when a distribution right of the contents is given, and the communication unit wirelessly transmits the condition information, which has been stored by the storage unit, to the other communication terminals regardless of whether the distribution right is given or not, Preferably, the communication unit wirelessly transmits the condition information, which has been stored by the storage unit, to the other communication terminals by multicast.

Preferably, the communication terminal may further comprise: an update unit that updates the condition information based on the additional information of the contents, which have been stored by the other communication terminals and wirelessly received by the communication unit.

Preferably, the communication terminal may further comprise: an update unit that updates the condition information that has been stored in the storage unit. The communication unit wirelessly receives the condition information from the other communication terminals, and the update unit updates the condition information, which has been stored in the storage unit, based on the condition information that has been wirelessly received by the communication unit.

Preferably, the other communication terminals distribute the contents only when the distribution right is given, and the communication unit wirelessly transmits, as the message, a message for giving the distribution right to the other communication terminals, which store the contents that have been selected.

Preferably, the communication unit wirelessly transmits a distribution instruction message for distributing the contents, which have been stored by the other communication terminals, to the other communication terminals that store the contents that have been selected.

Preferably, the contents are image data.

A communication terminal may include: a storage unit that stores contents and additional information of the contents; a communication unit that wirelessly receives condition information for deciding a play order of the contents and the contents, which have been stored by other communication terminals, from the other communication terminals that join a network; a play unit that plays the contents that have been wirelessly received by the communication unit; and a selection unit that retrieves the contents suitable for the condition information, which has been wirelessly received, from the contents that have been stored by the storage unit. If the selection unit retrieves the contents suitable for the condition information that has been wirelessly received, then the communication unit wirelessly transmits the additional information of the contents, which have been retrieved by the selection unit, to the other communication terminals as a response to the condition information that has been wirelessly received.

Preferably, the communication unit wirelessly receives a message for wirelessly transmitting the contents, which have been stored by the storage unit, from the other communication terminals that are a wireless transmission destination of the additional information.

Preferably, the communication unit receives the condition information from the other communication terminals by multicast.

Preferably, only when a distribution right of the contents is given, the communication unit wirelessly transmits the contents, which have been stored by the storage unit, to the other communication terminals, and only when the distribution right is not given, if the communication unit wirelessly receives the condition information and the contents, which have been stored by the other communication terminals, from the other communication terminals, and the selection unit retrieves the contents suitable for the condition information, then the communication unit wirelessly transmits the additional information of the contents, which have been retrieved by the selection unit, to the other communication terminals as a response to the condition information, which has been wirelessly received.

A communication method by a communication terminal may include: a transmission step of wirelessly transmitting condition information deciding play order of contents to other communication terminals joining a network; a reception step of wirelessly receiving additional information of the contents, which have been stored by the other communication terminals, from the other communication terminals as a response to the condition information, which has been wirelessly transmitted in the transmission step; a selection unit step of comparing the additional information of the contents, which have been stored, with the additional information of the contents, which has been wirelessly received in the reception step, so as to select contents suitable for the condition information, which has been transmitted in the transmission step, from among the contents, which have been stored, and the contents, which have been stored by the other communication terminals; and an instruction step of wirelessly transmitting a message for wirelessly transmitting the contents, which have been selected, to the other communication terminals, which store the contents that have been selected, if the contents, which have been stored by the other communication terminals, are selected in the selection step.

BRIEF DESCRIPTION OF THE DRAWINGS

The above features and advantages of the present invention will be more apparent from the following detailed description of certain preferred embodiments taken in conjunction with the accompanying drawings, in which:

FIG. 11 is a sequence diagram showing the operation of the communication system according to an embodiment;

DETAILED DESCRIPTION OF THE PREFERRED EMBODIMENTS

The present invention will be now described herein with reference to illustrative embodiments. Those skilled in the art will recognize that many alternative embodiments can be accomplished using the teachings of the present invention and that the invention is not limited to the embodiments illustrated for explanatory purposes.

Figure 1A:
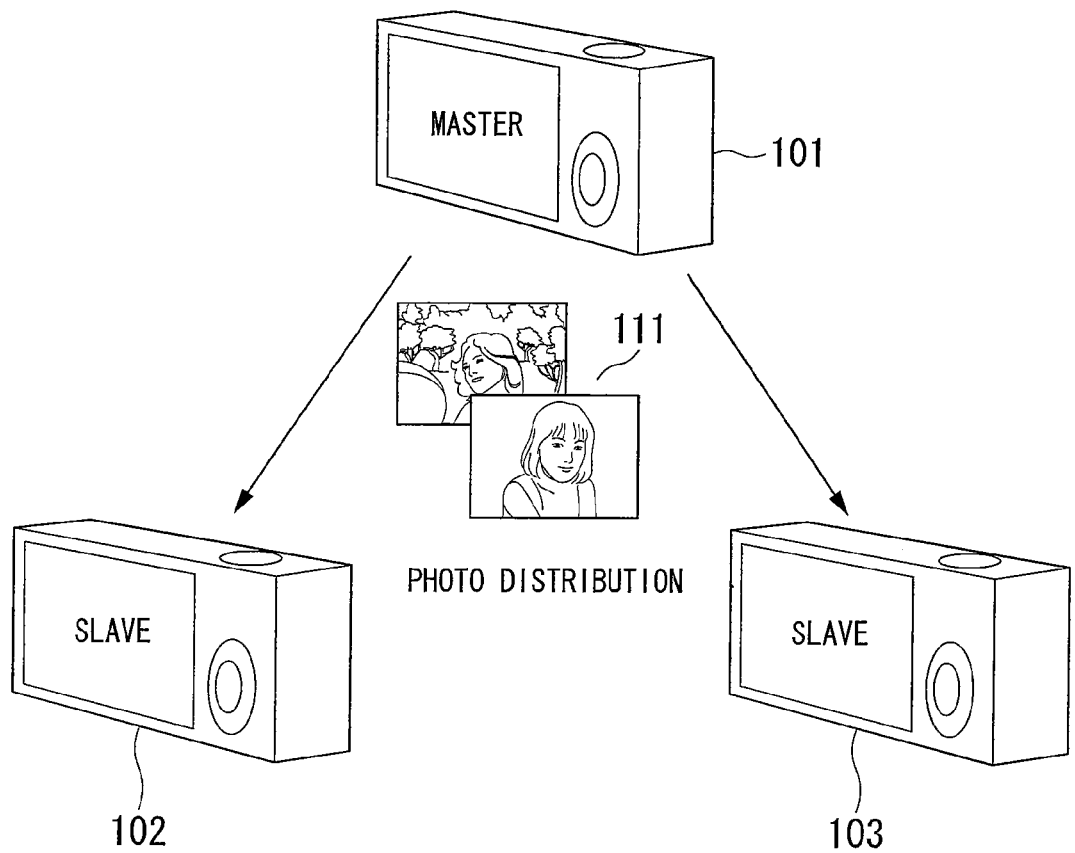
FIGS. 1A and 1B are configuration diagrams showing the configuration of a communication system and the configuration of a user interface screen according to an embodiment.

Hereinafter, embodiments of the present invention will be described with reference to the drawings. FIG. 1A shows the configuration of a communication system according to an embodiment of the present invention. This communication system has a plurality of digital cameras including digital cameras 101, 102, and 103. Photos (image data) which are content (electronic data) possessed by the digital cameras are shared by the digital cameras.

The digital cameras 101, 102, and 103 have a wireless communication function, constructs a network, and are in a state in which data communication is possible. In a state shown in FIG. 1A, the digital camera 101 transmits its own taken and stored photos 111 to the digital cameras 102 and 103. To transmit the photos 111 to a plurality of terminals such as the digital cameras 102 and 103, the digital camera 101 transmits the photos using a technique such as IP multicast. The digital camera 101 displays the transmitted photos 111 on its own display unit after transmitting the photos 111. The digital cameras 102 and 103 receive the photos 111 from the digital camera 101 and respectively display the received photos 111 on their own display units.

Each digital camera has a functional role. Specifically, each digital camera has one of a role (master) of generating a keyword to be described later and distributing a photo and a role (slave) of receiving a photo transmitted from another digital camera. It is possible to sequentially play or share photos possessed by each digital camera by changing the role according to a condition (keyword). The condition (keyword) is updated every time the photo is repeatedly distributed and played.

Figure 1B:
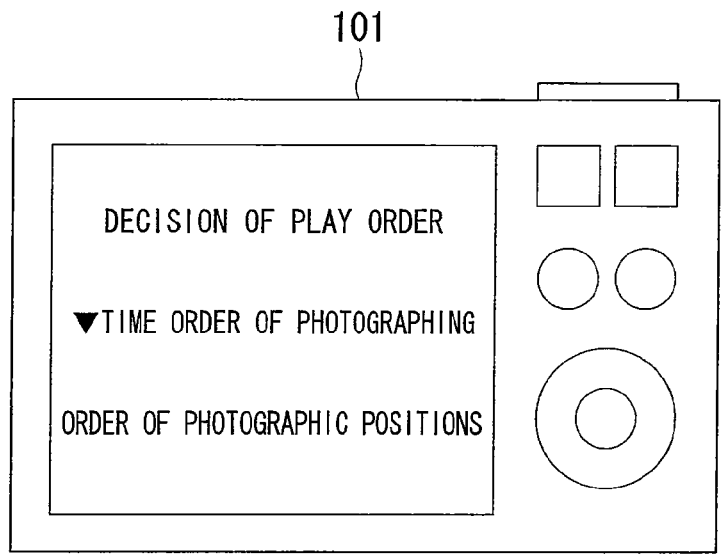

FIG. 1B shows a user interface screen when the digital camera 101 distributes a photo. The digital camera 101 displays a menu regarding play order such as "time order of photographing" or "order of photographic places" shown in FIG. 1B on the display unit as a first trigger of a continuous photo play operation in cooperation with the digital cameras 102 and 103 and prompts the user to make an input.

The "time order of photographing" means that photos are distributed from an old/new time among photographing times of photos stored inside each digital camera which is currently being connected to the network. The "order of photographic places" means that photos are distributed in order of photographic places of photos stored in each digital camera which is currently being connected to the network. For example, various play patterns such as "from north to south", "from east to west", and "from a current position to a close/far position" exist as the order of photographic places. This play order may be based on camera equipment information or photographic parameters assigned to photo data and metadata assigned by the user as well as information of the photographing times and the photographic positions. In preprocessing in which photos are distributed between digital cameras, a condition indicating the play order is decided and then shared between the digital cameras.

Figure 2:
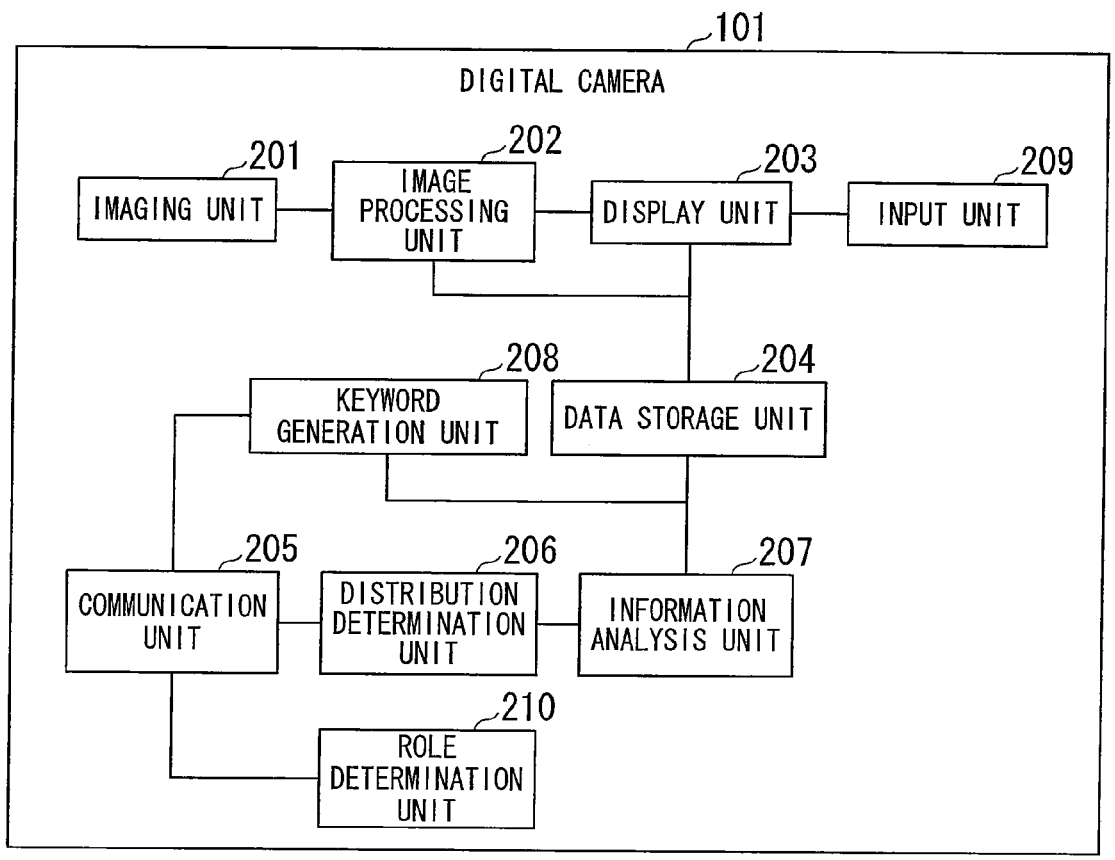
FIG. 2 is a block diagram showing the configuration of a digital camera according to an embodiment.

FIG. 2 shows the configuration of the digital camera 101. In FIG. 2, the configuration of the digital camera 101 is representatively shown, but the configurations of the other digital cameras are the same as that of the digital camera 101. The digital camera 101 has an imaging unit 201, an image processing unit 202, a display unit 203, a data storage unit 204, a communication unit 205, a distribution determination unit 206, an information analysis unit 207, a keyword generation unit 208, an input unit 209, and a role determination unit 210.

The imaging unit 201 takes a photo and generates photo data (image data). The image processing unit 202 adjusts a parameter of the photo data generated by the imaging unit 201 or converts and processes the image format thereof. The display unit 203 displays the photo data photographed by the imaging unit 201 and photo data received from other digital cameras. The data storage unit 204 holds and stores the photo data photographed by the imaging unit 201 and the photo data received from other digital cameras.

The communication unit 205 performs data communication with the other digital cameras. The distribution determination unit 206 determines whether to shift the distribution right to another digital camera, and generates a determination result message. The information analysis unit 207 analyzes which of its own data storage unit 204 and the data storage unit 204 of another digital camera has the next photo to be distributed. The keyword generation unit 208 generates a condition (keyword) to be transmitted to another digital camera so as to select the next photo to be played at the time of continuously playing photos. The input unit 209 receives various inputs from the user. The role determination unit 210 determines whether the role of the digital camera 101 is that of a master or slave.

Figure 3:
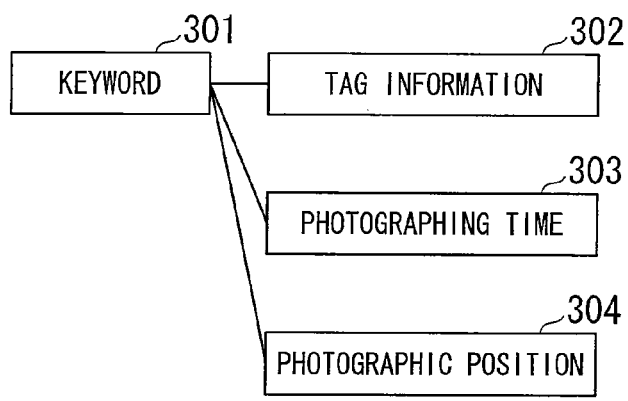
FIG. 3 is a reference diagram showing a keyword according to an embodiment.

FIG. 3 shows a keyword (condition information) to be transmitted from a digital camera to another digital camera so as to decide the order of photo distribution. For example, a keyword 301 is information including at least one of tag information 302, a photographing time 303, and a photographic position 304. The photographing time 303 includes time information for the next photo that the user desires to play. The digital camera receiving the time information checks whether a photo related to the time information exists in its own data storage unit 204, and makes a response for the presence/absence thereof.

The photographic position 304 includes position information for the next photo that the user desires to play. The digital camera receiving the information checks whether a photo related to the position information exists in its own data storage unit 204, and makes a response for the presence/absence thereof. The tag information 302 indicates information other than the photographing time and the photographic position. For example, information regarding photographic setting such as photographic parameters or photographic equipment information, or information regarding photographic conditions such as weather and temperature is comment information arbitrarily decided by the user.

Next, the operation when the communication system performs data sharing according to this embodiment will be described. Hereinafter, seven operation examples will be described.

(First Operation Example)

Figure 4B:
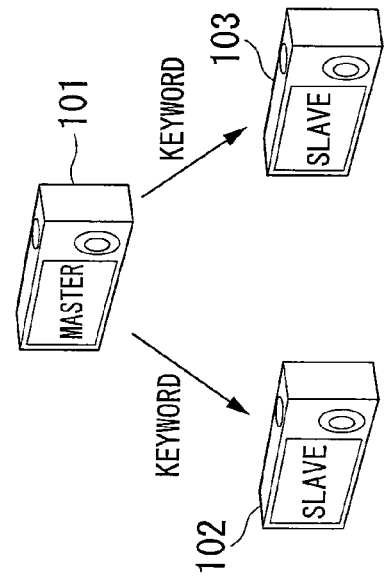
FIGS. 4A to 4D are reference diagrams showing operation images of the communication system according to an embodiment.
Figure 4D:
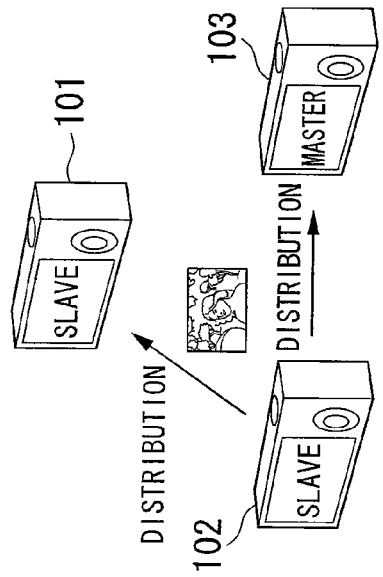
Figure 4A:
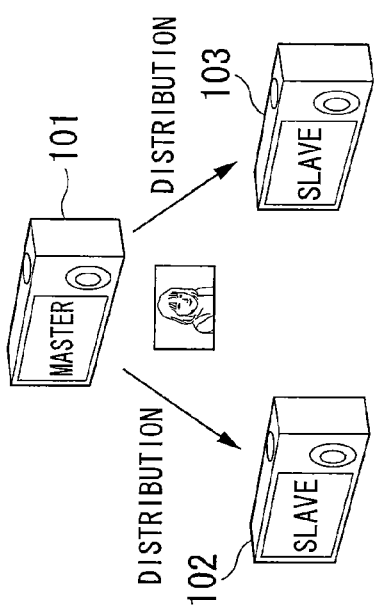

FIGS. 4A to 4D show operation images from the start of image distribution to the shift of a distribution right. First, as shown in FIG. 4A, the digital camera 101 among the digital cameras 101, 102, and 103 constructing the network has the master role and distributes a photo to the digital cameras 102 and 103. A method of deciding a digital camera having the master role will be described later.

Figure 4C:
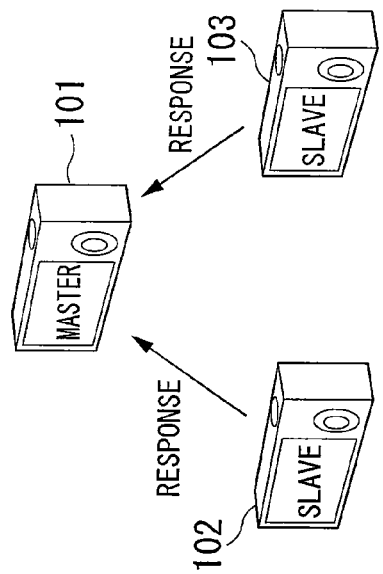

As shown in FIG. 4B, the digital camera 101 transmits a keyword to the digital cameras 102 and 103. Immediately when the keyword is received, the digital cameras 102 and 103 retrieve and analyze whether a photo suitable for the received keyword exists in their own data storage units 204, and transmit the retrieval and analysis results as responses to the digital camera 101 as shown in FIG. 4C.

When the photo suitable for the keyword from the digital camera 101 exists in the data storage unit 204 of the digital camera 102, the digital camera 102 acquires the distribution right from the digital camera 101 by transfer and transmits the photo to the digital camera 101 and the digital camera 103 as shown in FIG. 4D. The digital cameras 101 and 103 display the received photo on the display units 203 and also store the received photo in the data storage units 204.

Figure 5:
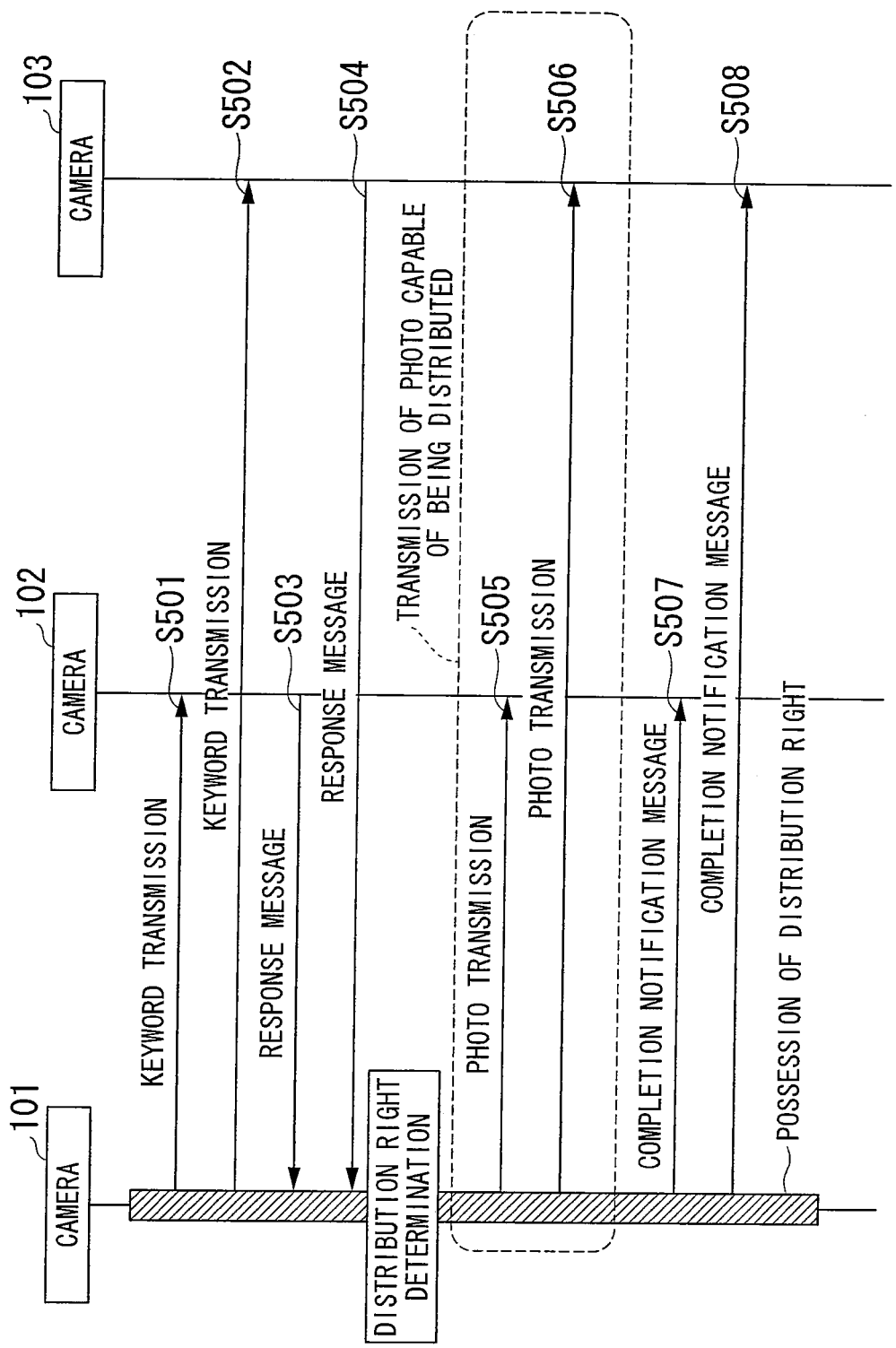
FIG. 5 is a sequence diagram showing the operation of the communication system according to an embodiment.

FIG. 5 shows a sequence in which the digital camera 101 transmits an image to the digital cameras 102 and 103. First, the digital camera 101 transmits a keyword to the digital cameras 102 and 103 (steps S501 and S502). After receiving the keyword, the digital cameras 102 and 103 retrieve and analyze whether a photo suitable for the keyword exists in their own data storage units 204, and transmit the retrieval and analysis results as response messages to the digital camera 101 (step S503 and S504).

The response message is a list of photo information suitable for the received keyword. For example, when the keyword is the photographing time 303, a response message including a list of photo file names of photos having photographing times close to the photographing time 303 and the photographing times are transmitted.

Subsequently, the digital camera 101 determines whether to transfer the distribution right based on the response messages received from the digital cameras 102 and 103. Specifically, the digital camera 101 compares the content of the received response messages with additional information such as photographing times or photographic positions attached to photos present in its own data storage unit 204 and detects a photo most suitable for the keyword. As a result, when it is determined that a photo present in the data storage unit 204 of the digital camera 101 is more suitable for the keyword than photos present in the data storage units 204 of the digital cameras 102 and 103, the digital camera 101 transmits the photo to the digital cameras 102 and 103 (steps S505 and S506).

As long as a photo which is more suitable for the keyword than any photo present in the data storage units 204 of the digital cameras 102 and 103 is present in its own data storage unit 204, the digital camera 101 repeats photo transmission (steps S505 and S506). When a photo capable of being transmitted by the digital camera 101 does not exist and also a photo capable of being transmitted to other digital cameras does not exist, the digital camera 101 transmits a completion notification message to the digital cameras 102 and 103 (steps S507 and S508). The digital cameras 102 and 103 receiving the completion notification message end the photo play operation.

Figure 6:
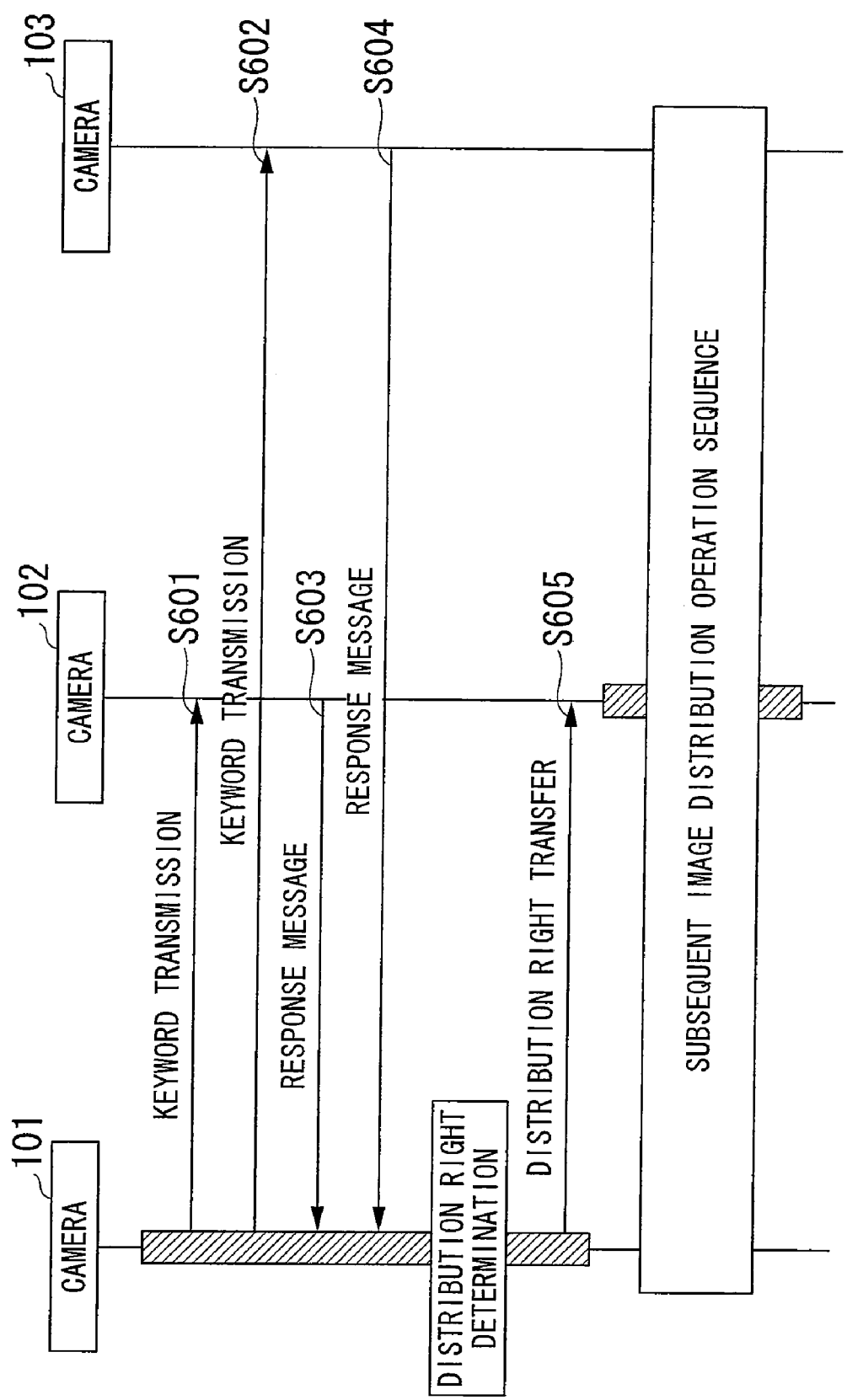
FIG. 6 is a sequence diagram showing the operation of the communication system according to an embodiment.

FIG. 6 shows a sequence in which the digital camera 101 transfers the distribution right to the digital camera 102. The digital camera 101 transmits a keyword to the digital cameras 102 and 103 (step S601 and S602). After receiving the keyword, the digital cameras 102 and 103 retrieve and analyze whether a photo suitable for the keyword exists in their own data storage units 204, and transmit the retrieval and analysis results as response messages to the digital camera 101 (step S603 and S604).

The digital camera 101 determines whether to transfer the distribution right based on the response messages received from the digital cameras 102 and 103. Specifically, the digital camera 101 compares information of the received response messages to photos present in its own data storage unit 204 and detects a photo most suitable for the keyword. As a result, when it is determined that a photo present in the data storage unit 204 of the digital camera 102 is more suitable for the keyword than photos present in the data storage units 204 of the digital cameras 101 and 103, the digital camera 101 transfers the distribution right to the digital camera 102 (step S605).

The digital camera 101 is released from the role of distributing a photo by transferring the distribution right. On the other hand, the digital camera 102 acquires the role of distributing a photo by transfer. Thereafter, the digital camera 102 distributes a photo to other digital cameras by performing the equivalent operation as in the operation sequence of the digital camera 101 shown in FIG. 5.

Figure 7:
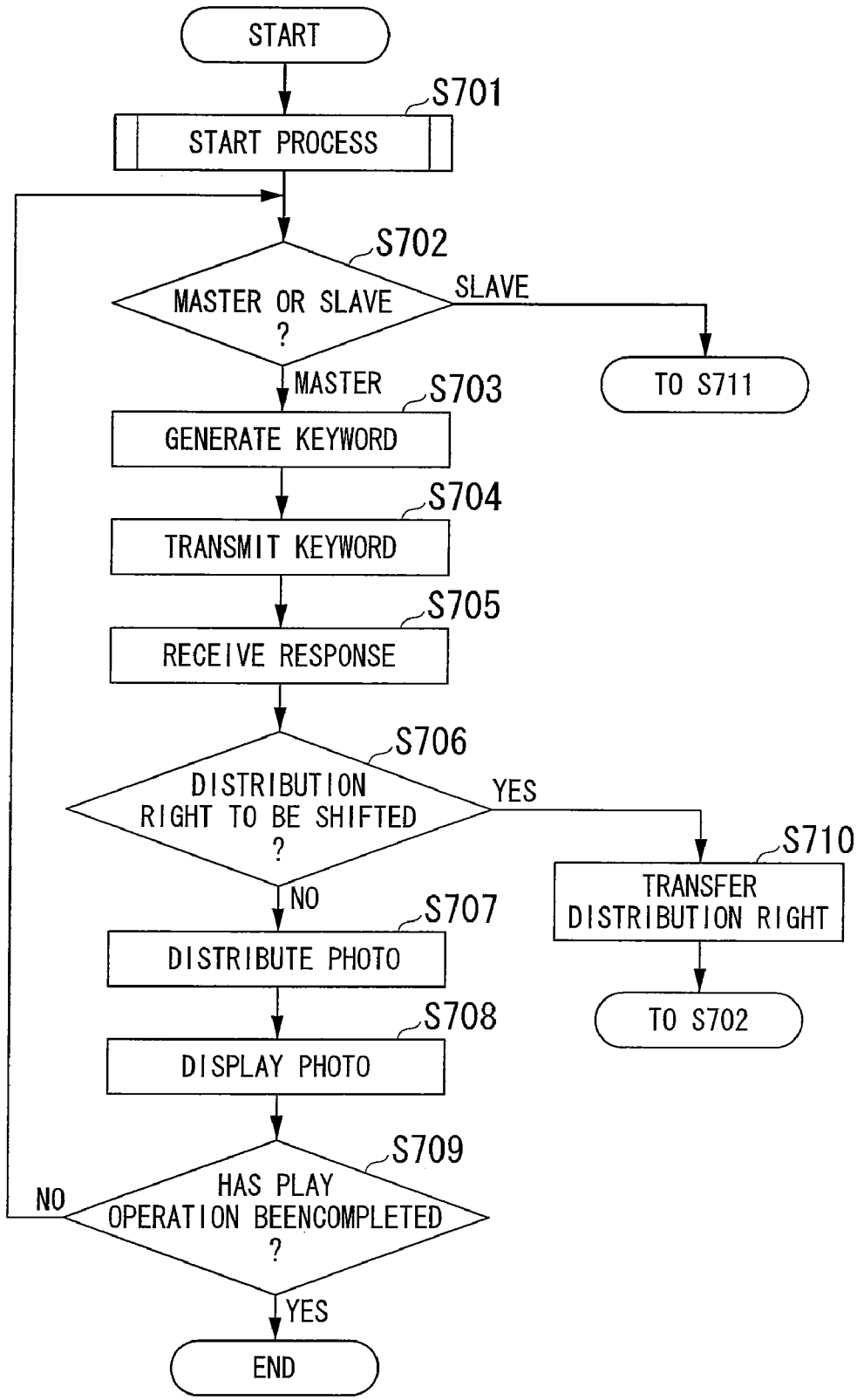
FIG. 7 is a flowchart showing the operation of digital cameras according to an embodiment.
Figure 8:
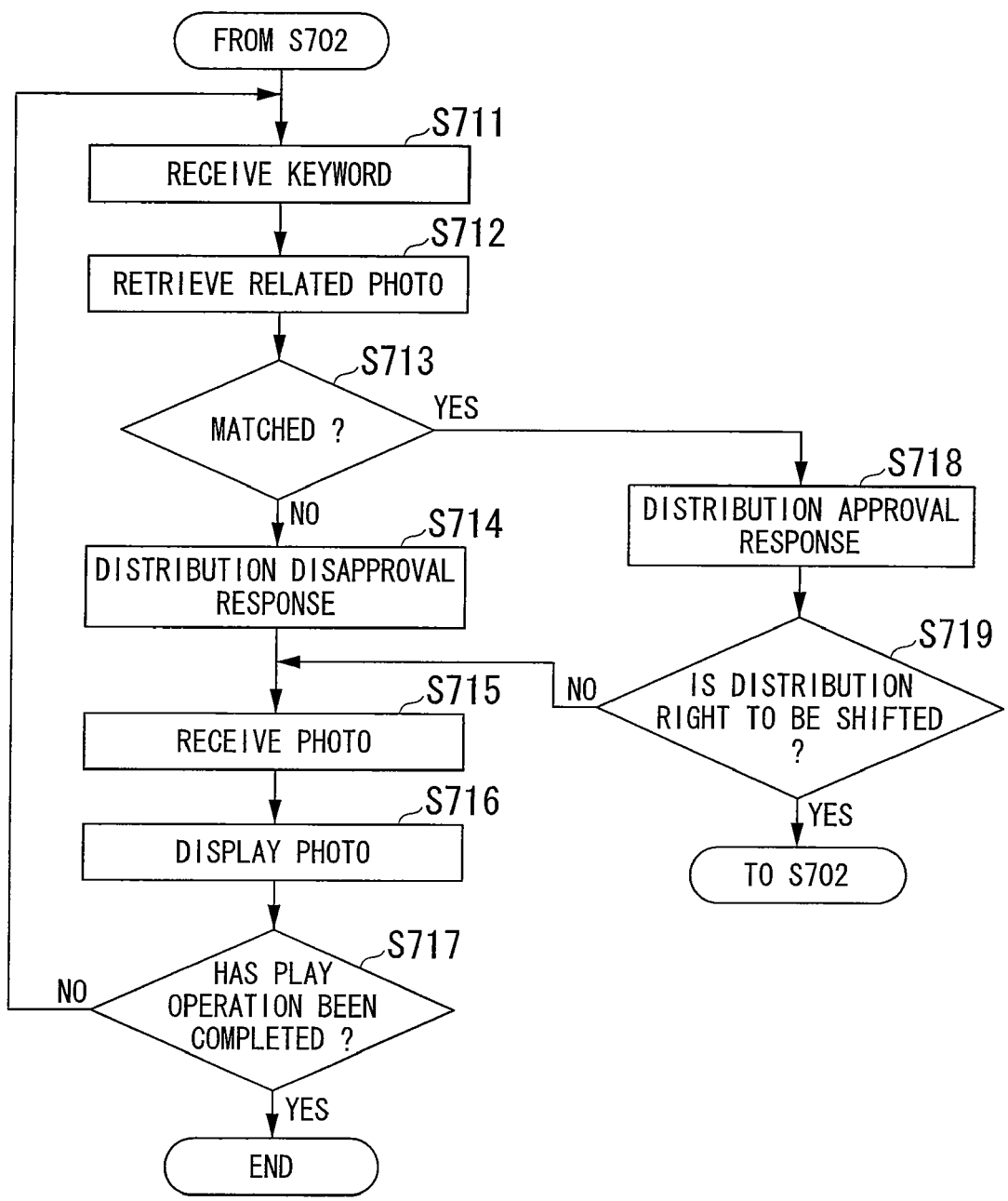
FIG. 8 is a flowchart showing the operation of digital cameras according to an embodiment.

Next, the detailed operation in each digital camera will be described. FIG. 7 shows the operation of a digital camera mainly having the master role, and FIG. 8 shows the operation of a digital camera having the slave role.

Figure 9:
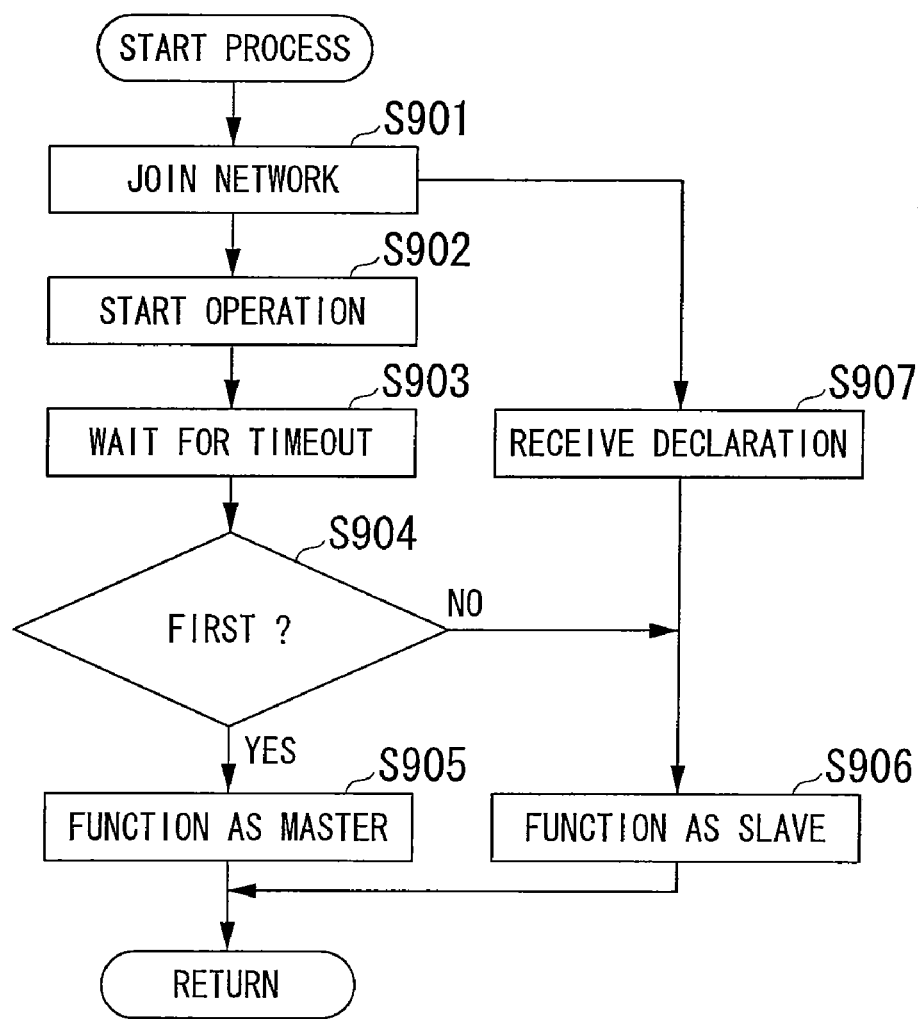
FIG. 9 is a flowchart showing the operation of digital cameras according to an embodiment.

First, the digital camera executes a start process (step S701). FIG. 9 shows the operation of the digital camera in the start process.

First, the digital camera joins a network via the communication unit 205 (step S901). The digital camera has an identifier (SSID) of its own constructed network, and joins a network when the network having the same identifier as the identifier has already been constructed. When the network having the same identifier as the identifier does not exist, the digital camera constructs a new network. The mechanism of network connection is based on content defined by IEEE 802.11.

Subsequently, the digital camera declares the start of a photo playing and sharing operation in the network by the user's operation on the input unit 209. The user may input an instruction for making the declaration by operating a menu like a menu shown FIG. 1B. This declaration is multicast and reported to other terminals within the same network by the communication unit 205 (step S902).

This declaration means data in which its own network address and a start declaration time are recorded. A terminal receiving the declaration may not make such a declaration when an operation of playing a series of photos within the network has not ended.

After the start declaration, the role determination unit 210 sets a timeout time (step S903), and determines whether the above-described declaration is received from other terminals within the timeout time (step S904). When the communication unit 205 has not received the declaration from the other terminals within the timeout time, the role determination unit 210 determines that its own role is the master (step S905).

When another terminal as well as its own terminal has made the start declaration and the communication unit 205 has received the declaration from another terminal within the timeout time, the role determination unit 210 determines the role from a declaration time within the declaration. The role determination unit 210 determines that its own role is the master when its own terminal has first made the declaration, and determines that its own role is the slave when another terminal has first made the declaration (step S905). On the other hand, when its own terminal does not make the start declaration after joining the network (step S901) and the communication unit 205 receives the declaration from another terminal (step S907), the role determination unit 210 determines that its own role is the slave (step S906). The above is the content of the start process.

After the start process has ended, the process is branched in response to its own role (master/slave) (step S702). When its own role is the slave, the process proceeds to step S711 of FIG. 8. When its own role is the master, the keyword generation unit 208 generates a keyword and stores the generated keyword in the data storage unit 204 (step S703). A specific keyword generation method will be described later.

After generating the keyword, the communication unit 205 transmits the keyword to another digital camera (step S704). After transmitting the keyword, the communication unit 205 waits for a response message from another digital camera and receives the response message (step S705). After receiving the response message, the information analysis unit 207 reads a keyword from the data storage unit 204 and compares the keyword with the content of the response message and additional information of photos stored in its own data storage unit 204. Based on the comparison result, the information analysis unit 207 selects a photo (a distribution target photo) to be distributed next and reports the selected photo to the distribution determination unit 206. The distribution determination unit 206 determines whether or not to shift the distribution right in response to whether a digital camera having the distribution target photo is its own digital camera or another digital camera (step S706).

The distribution target photo is a photo most suitable for the keyword among photos present in its own data storage unit 204 and photos present in the data storage units 204 of other digital cameras. When the photo most suitable for the keyword exists in the data storage unit 204 of another digital camera, the photo present in the data storage unit 204 of another digital camera is selected as the next distribution target. In this case, the distribution determination unit 206 determines to shift the distribution right. At this time, the distribution determination unit 206 decides a digital camera of a partner to which the distribution right is transferred as a digital camera having the distribution target photo, and generates a distribution right transfer message indicating the transfer of the distribution right.

When the photo most suitable for the keyword is a photo present in its own data storage unit 204, the photo present in its own data storage unit 204 is selected as the next distribution target. In this case, the distribution determination unit 206 determines not to shift the distribution right. At this time, the distribution determination unit 206 reads a photo to be transmitted to another digital camera from among photos present in its own data storage unit 204, and outputs the read photo to the communication unit 205.

At the time of determining to shift the distribution right, the communication unit 205 transmits the distribution right transfer message to the digital camera of the partner to which the distribution right is transferred (step S710). Subsequently, its own role is changed from the master to the slave, and the process proceeds to step S711 of FIG. 8. At the time of determining not to shift the distribution right, the communication unit 205 transmits the photo most suitable for the keyword to another digital camera (step S707).

Subsequently, the same photo as the photo to be transmitted to another digital camera is displayed on the display unit 203 (step S708). After the photo is displayed, the distribution determination unit 206 determines whether a photo play operation has been completed (step S709). When the photo suitable for the keyword does not exist in any one of its own data storage unit 204 and the data storage unit 204 of another digital camera, the communication unit 205 transmits the completion notification message to another digital camera and the photo play operation is ended. When the photo suitable for the keyword exists in at least one of its own data storage unit 204 and the data storage unit 204 of another digital camera, the process from step S702 is re-executed.

On the other hand, when its own role is the slave, the communication unit 205 receives a keyword from another digital camera as shown in FIG. 8 (step S711). Based on the keyword, the information analysis unit 207 retrieves/analyzes a photo suitable for the keyword from photos stored in its own data storage unit 204 (step S712).

Subsequently, based on the retrieval result, the information analysis unit 207 determines whether the photo suitable for the keyword exists (step S713). When the photo suitable for the keyword does not exist, the information analysis unit 207 generates a response message indicating that a photo capable of being distributed does not exist. The communication unit 205 transmits the response message to the digital camera which is a transmission source of the keyword (step S714).

After the transmission of the response message indicating that a photo capable of being distributed does not exist, the communication unit 205 receives a photo transmitted from another digital camera (step S715). The received photo is displayed on the display unit 203 (step S716). When the completion notification message has been received from another digital camera after the photo is displayed (step S717), the photo play operation is ended. When the keyword has been re-received from another digital camera (step S711) without receiving the completion notification message (step S717), the process from step S712 is re-executed.

When a photo suitable for the keyword exists in step S713, the information analysis unit 207 generates a response message indicating that the photo capable of being distributed exists. The communication unit 205 transmits the response message to a digital camera which is a transmission source of the keyword (step S718).

When the communication unit 205 has received a distribution right transfer message from another digital camera after the transmission of the response message indicating that the photo capable of being distributed exists, its own role is changed from the slave to the master and the process from step S703 is executed. When the communication unit 205 has received a photo from another digital camera after the transmission of the response message indicating that the photo capable of being distributed exists (step S715), the received photo is displayed on the display unit 203 (step S716). It is possible to continuously play relevant photos while sharing photos between digital cameras according to the above-described operation sequence.

Figure 10A:
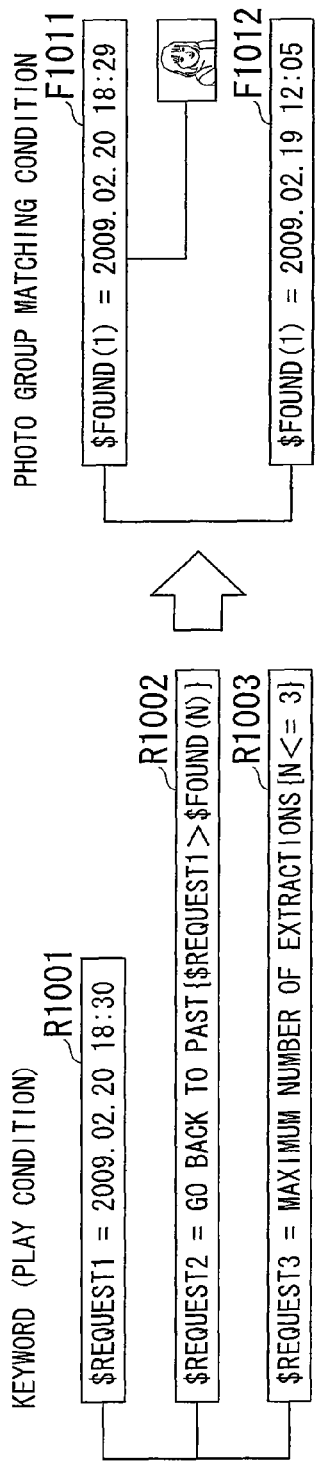
FIGS. 10A and 10B are reference diagrams showing a keyword and a photo information list according to an embodiment.

Next, the content of a process of shifting the distribution right using a specific example of the keyword and a process of generating the keyword will be described. FIG. 10A shows an example of the keyword. In the example shown in FIG. 10A, the keyword designates the condition that photographing time information such as "2009.02.20 18:30" is designated (R1001), it goes back from the present time to a previous time (R1002), and the top three matched items or less are extracted (R1003) as the play condition. The information analysis unit 207 extracts photos F1011 and F1012 which satisfy the play condition designated by the keyword in step S712.

Figure 10B:
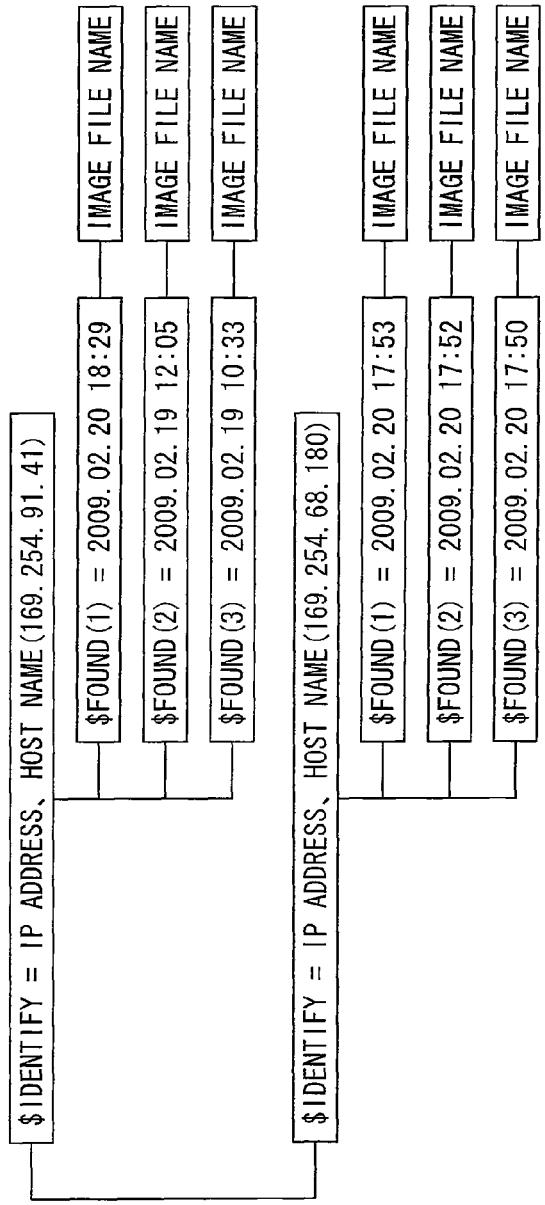

FIG. 10B shows a photo information list in which photos extracted according to the above-described conditions are listed. For example, when the digital camera 101 has the role (master) of distributing a photo, the information analysis unit 207 creates the photo information list by listing photos, which are capable of being distributed by each digital camera, included in response messages transmitted from the digital cameras 102 and 103 as shown in FIG. 10B in step S706. In the photo information list, an IP address and a host name of a digital camera from which the response message is returned are used as an identifier for identifying a terminal. A condition (photographing time information in FIG. 10B) and a file name suitable for the play condition are associated with each IP address and each host name.

After the generation of the photo information list, the information analysis unit 207 extracts a photo suitable for the play condition indicated by the keyword from photos stored in its own data storage unit 204. The information analysis unit 207 compares additional information (photographing time information in this case) of the extracted photo with the condition (photographing time information in this case) described in the photo information list, and selects a photo most suitable for the play condition indicated by the keyword based on the comparison result.

The distribution determination unit 206 determines whether a digital camera holding the photo selected by the information analysis unit 207 is its own digital camera or another digital camera, and determines whether or not to shift the distribution right in response to the determination result. When a digital camera holding the photo selected by the information analysis unit 207 is its own digital camera, the distribution determination unit 206 determines not to shift the distribution right. When a digital camera holding the photo selected by the information analysis unit 207 is another digital camera, the distribution determination unit 206 determines to shift the distribution right.

The digital camera having the distribution right generates a keyword in step S703. A keyword generation method is of two types. The first method is a method in which the keyword generation unit 208 generates a keyword based on an instruction input to the input unit 209 in a state in which the screen shown in FIG. 1B is displayed on the display unit 203. The second method is a method in which an previously generated keyword is updated.

In the second method, for example, the keyword is updated as follows. In keyword examples shown in FIGS. 10A and 10B, the photographing time information R1001 which is the play condition is updated by photographing time information of a photo transmitted in step S707. Since the condition R1002 that it goes back from the photographing time information R1001 to a previous time is designated in the keyword examples shown in FIGS. 10A and 10B, the photographing time information R1001 is updated to a previous time every time a photo is transmitted in step S707.

By updating the keyword as described above, a photo inconsistent with the play condition intended by the user is not played. Specifically, in the keyword examples shown in FIGS. 10A and 10B, a photo having a new photographing time after that of a previously played photo is not played.

It is desirable to leave a record in a play list or the like in the data storage unit 204 so that a played photo is not redundantly played. When there are no more photos to be played by playing all photos suitable for the keyword, the photo distribution is ended.

(Second Operation Example)

FIG. 11 shows an operation sequence when a digital camera 104 newly joins a network while a photo is generated on the network constituted by digital cameras 101, 102, and 103.

First, the digital camera 101 transmits a keyword (steps S1101 and S1102). This keyword is multicast and transmitted to terminals within the same network. At this time, since the digital camera 104 does not yet exist in the same network, the keyword does not reach the digital camera 104 and a response message is also not returned from the digital camera 104.

After receiving the keyword, the digital cameras 102 and 103 retrieve and analyze whether a photo suitable for the keyword exists in their own data storage units 204, and transmit retrieval and analysis results as response messages to the digital camera 101 (steps S1103 and S1104). Subsequently, when the digital camera 101 determines a distribution right, the digital camera 104 joins the same network (step S1109).

The digital camera 101 distributes its own held photo to each terminal by IP multicast (steps S1105, S1106, and S1110). Here, the digital camera 101 is not particularly conscious of the join of the digital camera 104 to the network, but the photo is transmitted to all terminals joining the same network since the photo is distributed by IP multicast. Thus, even though the digital camera 104 has joined the network in mid course, it is possible to join a photo play operation which is being performed within the network and to play a photo.

When a keyword is re-transmitted from the digital camera 101 after the photo play operation, the digital camera 104 receives the keyword as in the digital cameras 102 and 103 by joining the same network. The digital camera 104 compares a photo group recorded inside the digital camera 104 with the content of the keyword and transmits a response message including information of a photo suitable for the keyword to the digital camera 101.

When a photo capable of being transmitted by the digital camera 101 does not exist and also a photo capable of being transmitted to other digital cameras does not exist, the digital camera 101 transmits a completion notification message by IP multicast (steps S1107, S1108, and S1111). The digital cameras 102, 103, and 104 receiving the completion notification end the photo play operation.

By the above-described operation, it is possible to play a photo recorded within the digital camera 104 joined in mid course of the photo play operation which is being performed within the network. When the digital camera 104 joins the photo play operation, it is possible for the digital cameras 101, 102, and 103 to share and play photos without having to change a play operation sequence and without having to perform a special new operation.

(Third Operation Example)

Figure 12:
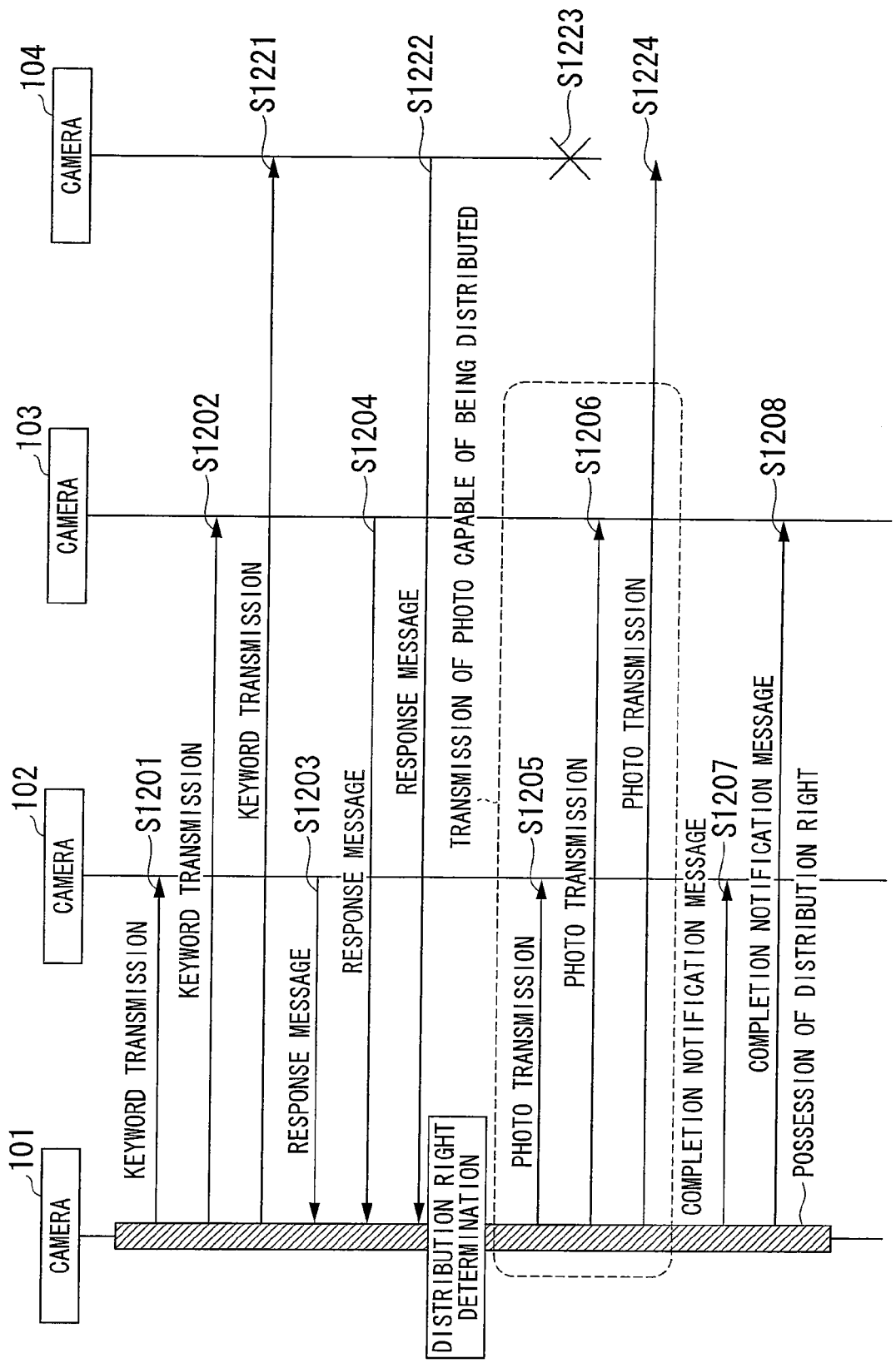
FIG. 12 is a sequence diagram showing the operation of the communication system according to an embodiment.

FIG. 12 shows an operation sequence when a digital camera 104 goes out of a network during a photo play operation on the network constituted by digital cameras 101, 102, 103, and 104. As an example in which the digital camera 104 disconnects from the network, there is the case where the digital camera 104 is powered off because of an operation by the user or battery separation, the case where the user performs an operation of a disconnection from the network, or the case where the digital camera 104 moves outside of the range of the network.

First, the digital camera 101 transmits a keyword by IP multicast (steps S1201, S1202, and S1221). The digital camera 104 receives the keyword from the digital camera 101 as in the digital cameras 102 and 103. The digital camera 104 compares the content (condition) of the keyword with a photo group recorded in the digital camera 104, and creates a response message. The digital camera 104 returns a response message (step S1222) in the same way as that the digital cameras 102 and 103 return response messages (steps S1203 and S1204).

The digital camera 101 receiving the response message from each digital camera creates a photo information list shown in FIG. 11, and determines which photo possessed by which digital camera is to be played next. In the example of FIG. 12, the digital camera 101 distributes its own photo to the other digital cameras 102, 103, and 104 by multicast without transferring the distribution right (steps S1205, S1206, and S1224).

Here, it is assumed that the digital camera 104 goes out of the network during the photo play operation (step S1223). Since only the photo distribution for each digital camera is unilaterally performed by multicast, the digital camera 101 is not particularly conscious of the presence/absence of a digital camera of a distribution destination. Accordingly, even though the digital camera 104 goes out of the network, there is no influence on the network in which the photo play operation is currently being performed and each digital camera thereof.

When a photo capable of being transmitted by the digital camera 101 does not exist and also a photo capable of being transmitted to other digital cameras does not exist, the digital camera 101 transmits a completion notification by IP multicast (steps S1207 and S1208). The digital cameras 102 and 103 receiving the completion notification message end the photo play operation.

By the above-described operation, it is possible for the digital cameras 101, 102, and 103 to share and play photos without having to change a play operation sequence and without having to perform a special new operation even when the digital camera 104 goes out of the network.

(Fourth Operation Example)

Figure 13:
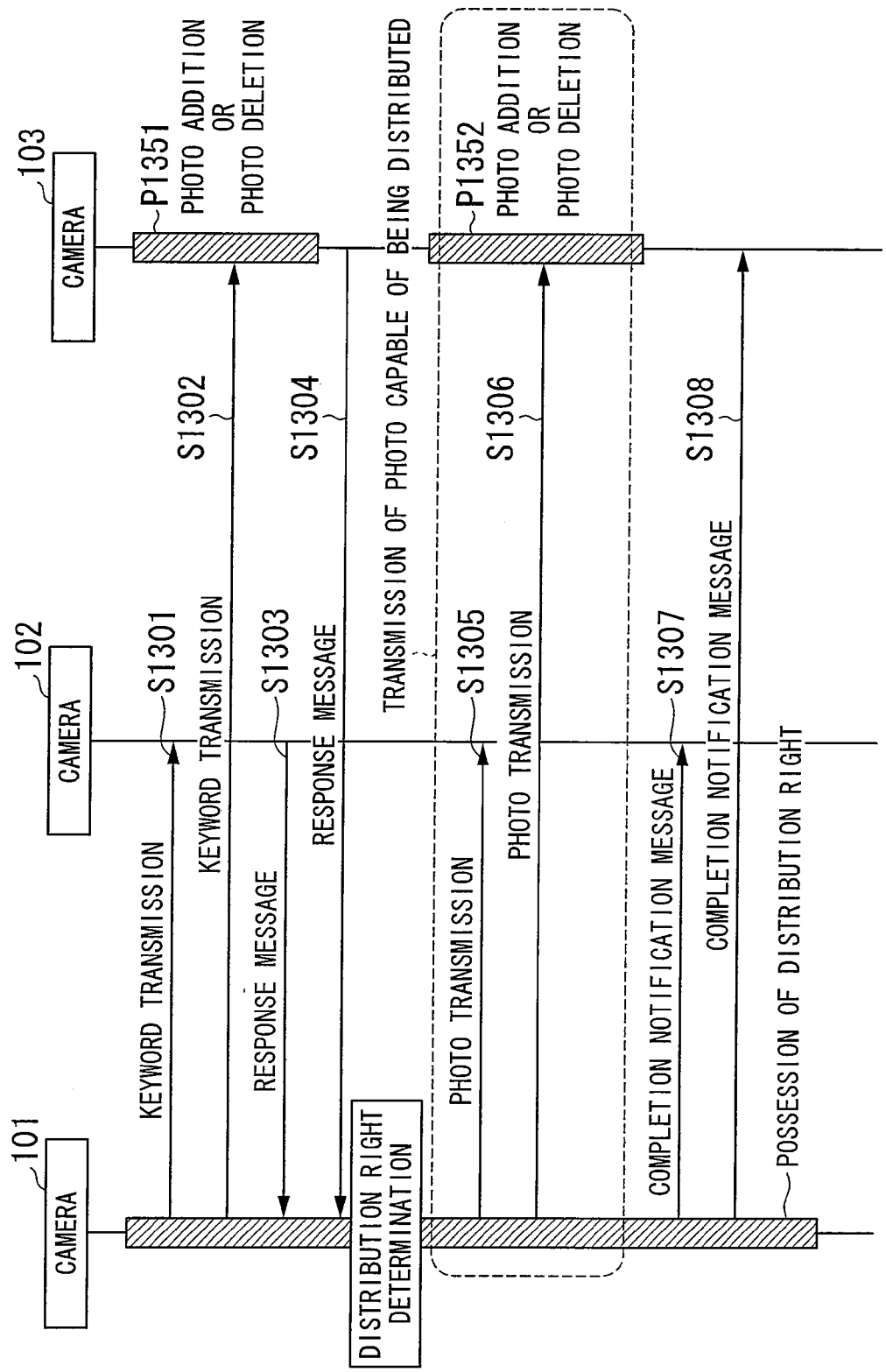
FIG. 13 is a sequence diagram showing the operation of the communication system according to an embodiment.

FIG. 13 shows an operation sequence when the number of photos recorded to a digital camera 103 is increased or decreased while a photo play operation is performed on a network constituted by digital cameras 101, 102, and 103. As an example in which the number of photos is increased or decreased, there is a case where the number of photos recorded within the digital camera is increased by taking a photo while a digital camera performs the photo play operation within the network as its own background process or the case where the number of photos recorded within a digital camera is decreased by deleting a photo recorded to the digital camera itself based on an operation of the user while the digital camera performs the photo play operation in the network as its own background process.

The above-described background process is a state in which a digital camera itself joins the network, performs communication for the photo play operation, and exchanges data, but indicates a state in which another operation is capable of being performed without limiting a function provided in the digital camera itself with respect to the photo play operation within the network.

First, the digital camera 101 transmits a keyword to the digital cameras 102 and 103 (steps S1301 and S1302). After the keyword is received, the digital cameras 102 and 103 retrieve and analyze whether a photo suitable for the keyword exists in their own data storage units 204, and transmit the retrieval and analysis results as response messages to the digital camera 101 (steps S1303 and S1304).

In FIG. 13, in a period P1351, the number of photos of the digital camera 103 is increased or decreased. The period P1351 is a period of time until the digital camera 103 receives a keyword from the digital camera 101 and returns a response message. When the number of photos is increased or decreased before a process of generating the response message is performed, the digital camera 103 generates the response message reflecting an increase or decrease thereof. Accordingly, the response message to be transmitted by the digital camera 103 includes information of an added photo when the added photo is suitable for the keyword and does not include information of a deleted photo. On the other hand, when the number of photos has been increased or decreased within the digital camera 103 during or after the generation of the response message by the digital camera 103, the response message does not reflect an increase or decrease of the number of photos.

The digital camera 101 distributes its own held photo to the digital cameras 102 and 103 (steps S1305 and S1306). In FIG. 13, the number of photos of the digital camera 103 is increased or decreased in the period P1352 when photos are distributed. Even though the number of photos of the digital camera 103 is increased or decreased, it is not necessary to add any new process. When an operation of playing distributed photos is ended and the generation and transmission of a keyword is re-executed by the digital camera 101, information of a photo of the digital camera 103 added or deleted in the period P1352 is reflected in the response message. Accordingly, even though the number of photos is increased or decreased within each digital camera, an operation of playing a photo which is currently being played is ended and information of an added or deleted photo is reflected in the photo play operation at a point in time when the next photo is played.

By the above-described operation, it is possible for the digital cameras 101, 102, and 103 to share and play photos without having to change a play operation sequence and without having to perform a special new operation even though the number of photos of the digital camera 103 is increased or decreased.

(Fifth Operation Example)

Figure 14:
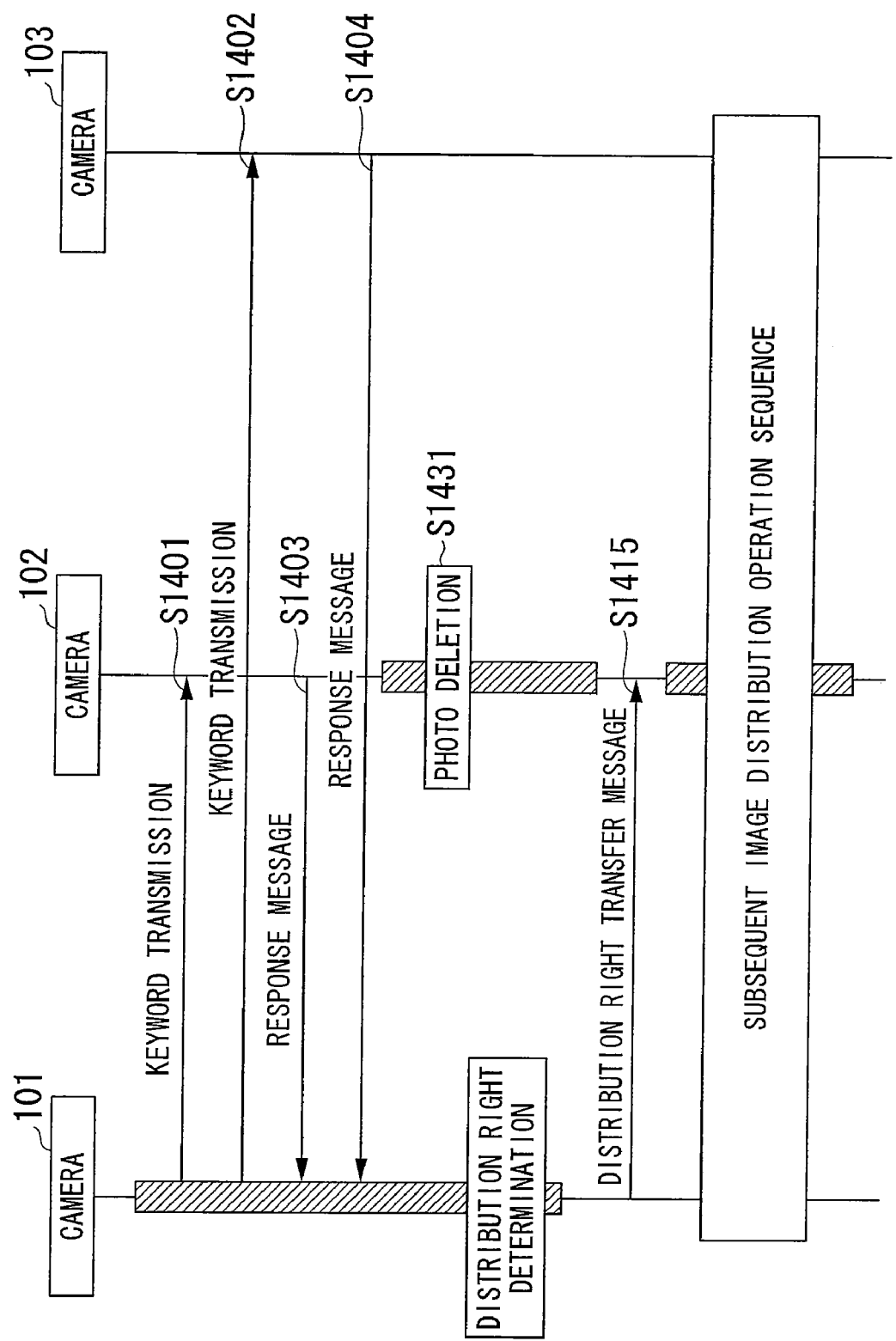
FIG. 14 is a sequence diagram showing the operation of the communication system according to an embodiment.

A process corresponding to an increase or decrease of the number of photos during a photo play operation on the same network when the distribution right is not transferred has been described above. The case where the number of photos has been increased or decreased within a digital camera to which the distribution right has been transferred will be described in the fifth operation example. FIG. 14 shows an operation sequence when the number of photos recorded to a digital camera 102 is increased or decreased during the photo play operation on a network constituted by digital cameras 101, 102, and 103.

First, the digital camera 101 transmits a keyword to the digital cameras 102 and 103 (steps S1401 and S1402). After receiving the keyword, the digital cameras 102 and 103 retrieve and analyze whether a photo suitable for the keyword exists in their own data storage units 204, and transmit the retrieval and analysis results as response messages to the digital camera 101 (steps S1403 and S1404).

When the number of photos has been increased or decreased within the digital camera 102 during or after the generation of the response message by the digital camera 102, the response message does not reflect an increase or decrease of the number of photos. When the number of photos of the digital camera 102 has been increased or decreased, the digital camera 101 receives the response message in which it is not reflected. In FIG. 14, the digital camera 101 transfers the distribution right to the digital camera 102 holding a photo suitable for the keyword reported by the digital camera 101 (step S1415).

Even though the distribution right is transferred to the digital camera 102 when the number of photos has been increased in the digital camera 102, no problem occurs since a distribution target photo exists within the digital camera 102. When a photo recorded to the digital camera 102 is deleted (step S1431) and the photo is selected as the distribution target photo, the distribution right is transferred to the digital camera 102 since the response message in which the photo deletion is not reflected is returned to the digital camera 101.

It seems that it is difficult to transfer the distribution right to the digital camera 102 which does not hold the distribution target photo. However, the digital camera 102 to which the distribution right has been transferred is able to newly select the next photo to be played by re-generating a keyword and transmitting the keyword to other digital cameras. Thus, even though the number of photos is increased or decreased, the photo play operation is performed without a particular problem. In this regard, only when the digital camera already obtaining the distribution right has selected a photo stored in its own data storage unit 204 as the next distribution target photo, it is desirable to limit the deletion of the photo by an operation of the user or the like until the distribution is completed by protecting the distribution target photo.

When the digital camera having the distribution right goes out of the network, the photo play operation on the network is ended. A digital camera (a digital camera having the slave role) which waits for a photo to be distributed sets a timeout value and ends a photo play process within its own network when a notification is not received from a digital camera having the distribution right for a fixed time. When the photo play operation is instructed by the user operating a menu displayed on the display unit 203, the photo play operation is re-started within the same network.

By the above-described operation, it is possible for the digital cameras 101, 102, and 103 to share and play photos without having to change a play operation sequence and without having to perform a special new operation even when the number of photos of the digital camera 102 to which the distribution right is transferred is increased or decreased.

(Sixth Operation Example)

Figure 15A:
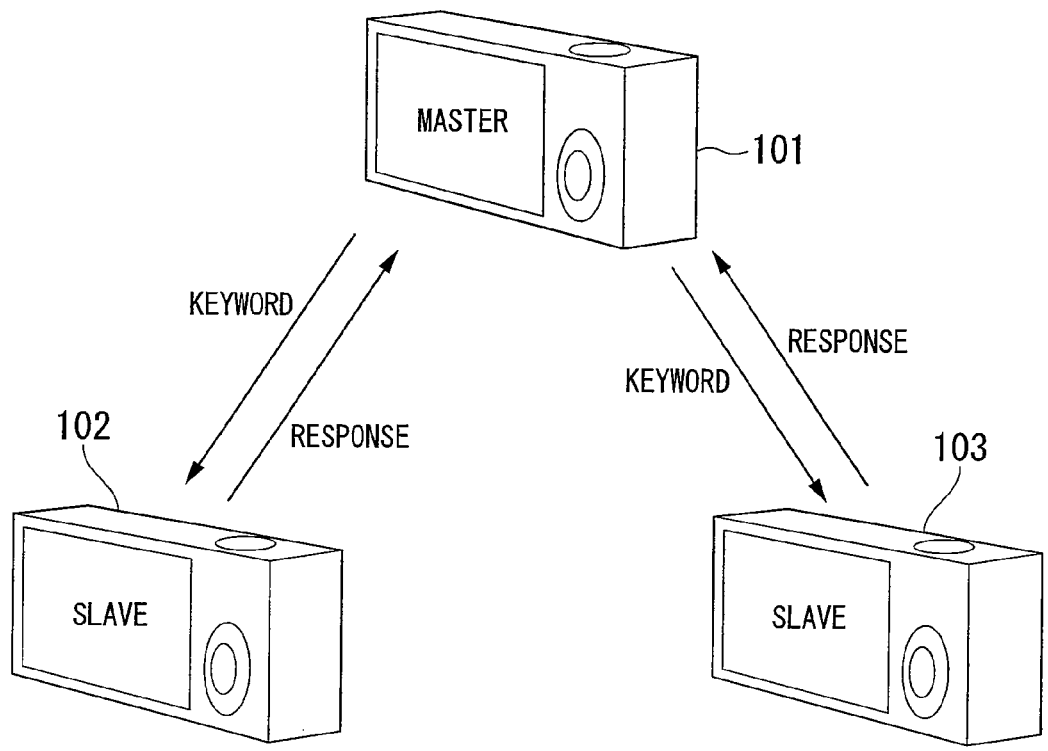
FIGS. 15A and 15B are reference diagrams showing operation images of the communication system according to an embodiment.
Figure 15B:
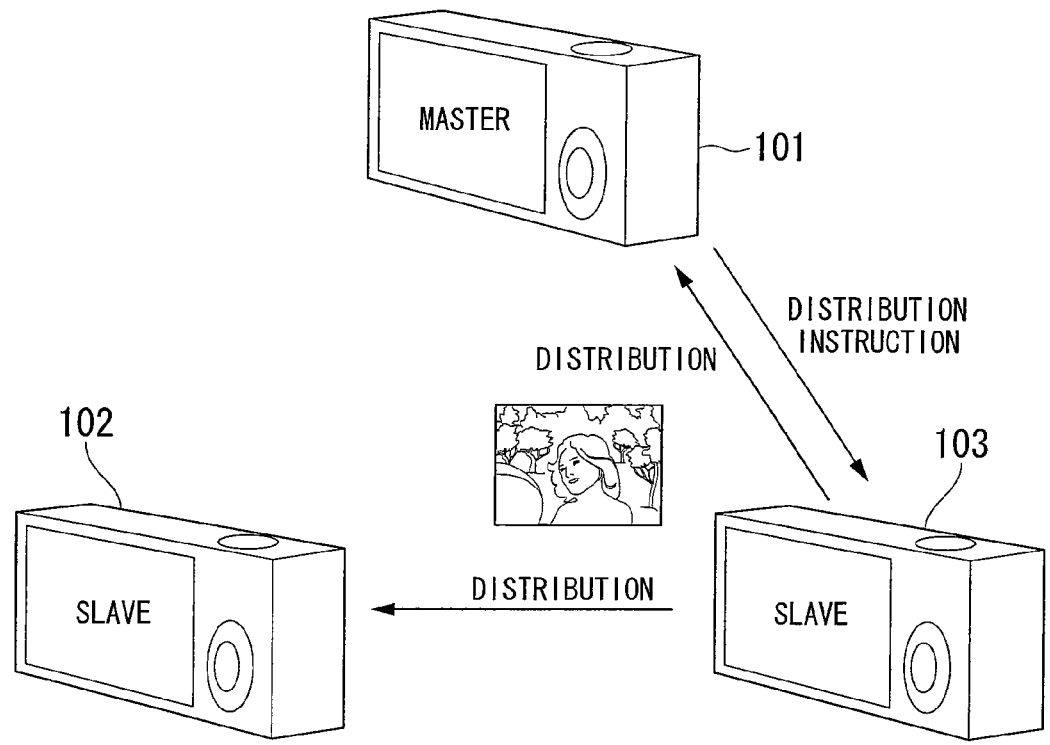

An example in which the master and slave relationship and the presence/absence of the distribution right have been integrated has been described above. That is, an example in which a terminal having the distribution right has the master role and a terminal not having the distribution right has the slave role has been described above. In the sixth operation example, the case where the master and slave relationship and the presence/absence of the distribution right are separated will be described. In the sixth operation example, the master role is to generate a keyword and select the next distribution target photo, and the slave role is to receive a keyword transmitted from another terminal and return a response message. FIGS. 15A and 15B show operation images when the distribution right is transferred from a digital camera 101 to a digital camera 103 during the photo play operation on a network constituted by digital cameras 101, 102, and 103.

First, the digital camera 101 transmits a keyword to the digital cameras 102 and 103 as shown in FIG. 15A. After receiving the keyword, the digital cameras 102 and 103 retrieve and analyze whether a photo suitable for the received keyword exists in their own data storage units 204, and transmit the retrieval and analysis results as response messages to the digital camera 101.

Subsequently, as shown in FIG. 15B, the digital camera 101 selects a photo most suitable for a play condition based on the content of the response messages from the digital cameras 102 and 103, and transmits a distribution instruction message to the digital camera 103 possessing the photo. At this time, the distribution determination unit 206 generates the distribution instruction message and the communication units 205 transmits the distribution instruction message to the digital camera 103. The distribution instruction message includes the file name of a photo to be distributed.

The digital camera 103 receives the distribution instruction message, distributes a photo indicated according to the distribution instruction message to the digital cameras 101 and 102, and displays the photo which is being distributed on its own display unit 203. At this time, the communication unit 205 receives the distribution instruction message and outputs the received message to the information analysis unit 207. The information analysis unit 207 reads the photo having the file name included in the distribution instruction message from the data storage unit 204. The communication unit 205 transmits the photo to the digital cameras 101 and 102.

The digital cameras 101 and 102 receive the photo and display the received photo on their own display units 203. At this time, the received photo may be stored in their own data storage units 204, and may be discarded after the play operation. In this case, the user may be prompted to perform the selection thereof.

By the above-described operation, the digital camera 103 having the distribution target photo is able to share and play a photo by obtaining the distribution right.

(Seventh Operation Example)

Figure 16:
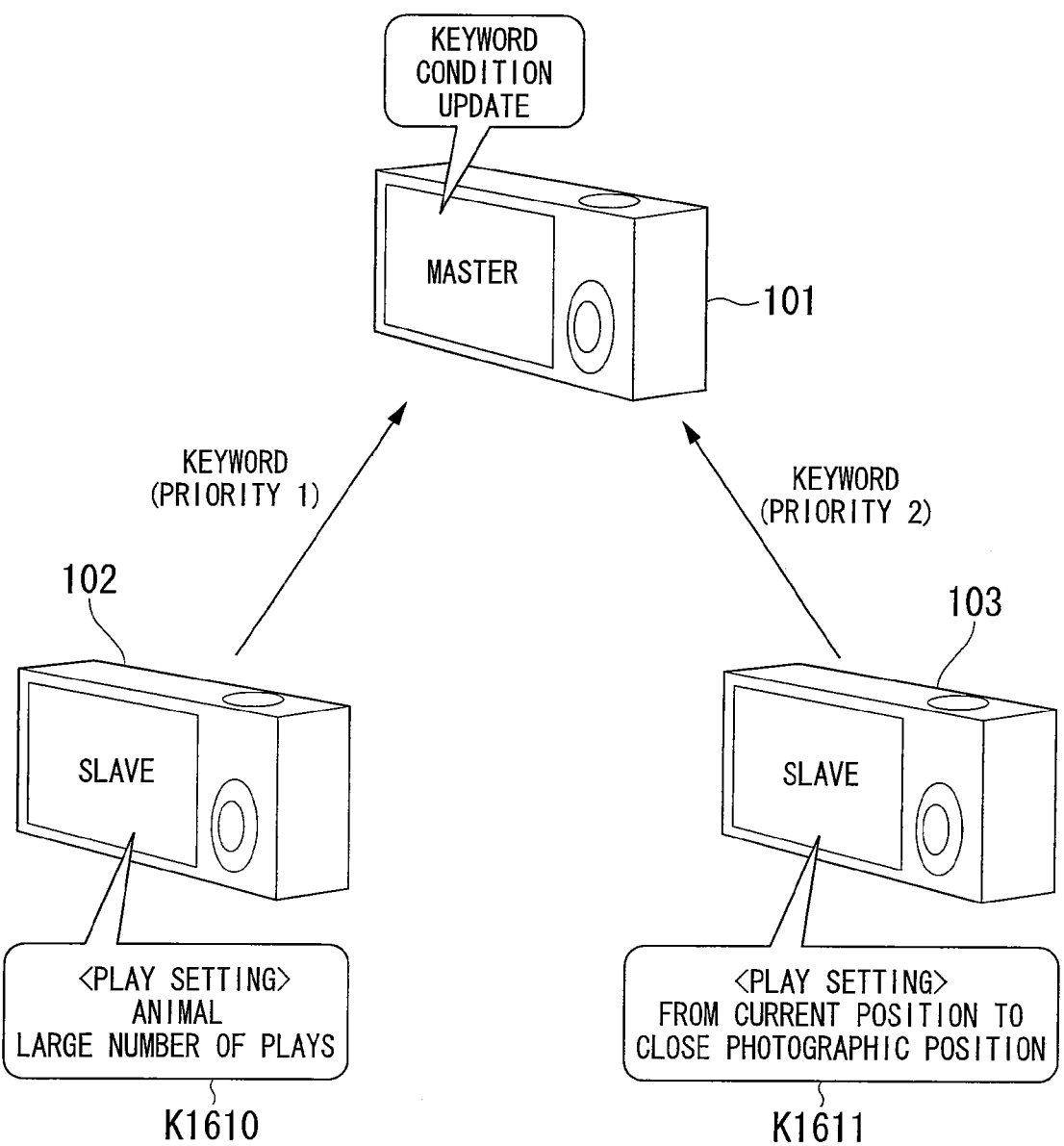
FIG. 16 is a reference diagram showing an operation image of the communication system according to an embodiment.

A terminal having a master role is able to update a keyword (play condition) in response to a request from a terminal having a slave role while a photo is played/shared within a network. FIG. 16 shows an operation image in which a digital camera 101 having the master role generates a new keyword based on keywords reported from digital cameras 102 and 103 having the slave role. The digital camera 102 and the digital camera 103 transmit keywords which are conditions of deciding the next photo to be played to the digital camera 101. Based on the received keywords, the digital camera 101 newly generates a keyword and retransmits the keyword to the digital cameras 102 and 103.

The digital camera 101 optionally selects a condition from among a plurality of conditions requested by the digital cameras 102 and 103, and generates a keyword. As a method in which the digital camera 101 selects a condition, there may be used a method in which a condition from a digital camera distributing a recent photo is preferentially selected, a condition from a digital camera in which the photo distribution is most absent is preferentially selected, or a condition from a digital camera which has recently taken a photo is preferentially selected. A keyword may be automatically generated based on information of its own played photo, and a keyword may be generated based on information input by the user's operation.

Figure 17A:
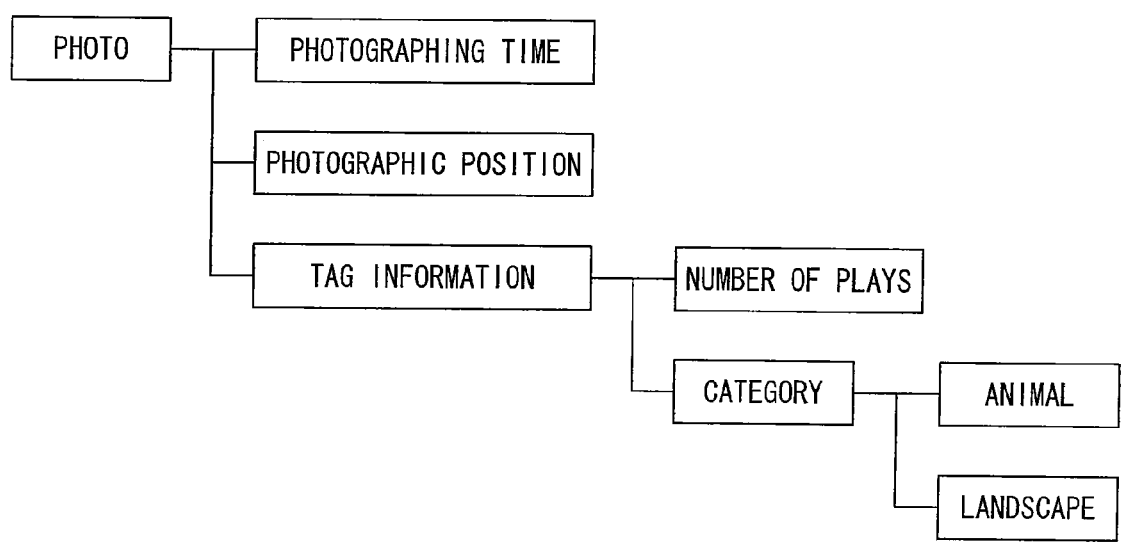
FIGS. 17A and 17B are reference diagrams illustrating a keyword generation method according to an embodiment.

Hereinafter, a method in which the digital camera 101 generates the keyword will be described in more detail. As shown in FIG. 17A, information such as a photographing time, a photographic position, and tag information is assigned to a photo recorded to each digital camera. Among pieces of such information, the photographing time and the photographic position are assigned to a photo as additional information at the time of photographing. The tag information includes various elements, but an example thereof is shown in FIG. 17A.

The number of plays is included in the tag information, and information indicating a subject to categorize a photo, for example, information (category name) such as an animal or landscape, is included. After photographing, a category name is set by the manual input of the user. Alternatively, the category name may be automatically titled in a digital camera having a function of analyzing and categorizing subject information by image processing. The number of plays is the number of photo plays and is counted up every time a photo is read.

Figure 17B:
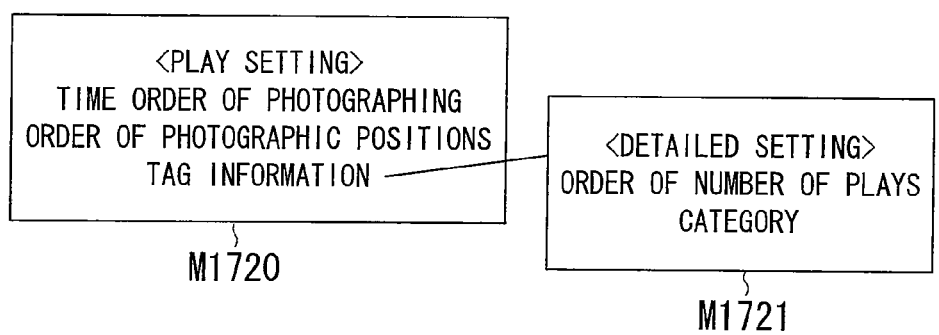

As shown in FIG. 16, the digital cameras 102 and 103 hold play settings K1610 and K1611 as their internal settings so that keywords from the digital cameras 102 and 103 having the slave role are updated. The user sets the play settings by selecting the play settings from a menu. FIG. 17B shows a setting menu. Information linked to information shown in FIG. 17A may be set by a menu M1720. Also, the tag information may be set by a menu M1721.

The menu M1720 is generated from information assigned to its own recorded photo. That is, the number of photos recorded within the digital camera is increased and assigned information is increased, so that the number of menu items capable of being set is increased. For example, when the tag information is selected in the case where an item included in the tag information is intended to be selected as the play condition, items of the number of plays and the category linked thereto are displayed. Through this procedure, the user selects a desired condition from the menu.

The digital cameras 102 and 103 hold information input by the user operating the menu as the play setting in the data storage unit 204. After receiving a photo distributed by photo playing and sharing within the network, the communication units 205 of the digital cameras 102 and 103 transmit the play settings stored in the data storage units 204 as keywords (play conditions) to the digital camera 101.

As shown in FIG. 16, the keywords of "animal" and "large number of plays" are transmitted as the play setting K1610 from the digital camera 102. Furthermore, the keyword of "from a current position to a close photographic position" is transmitted as the play setting K1611 from the digital camera 103.

The communication unit 205 of the digital camera 101 receives keywords from the digital cameras 102 and 103 and outputs the received keywords to the keyword generation unit 208. The keyword generation unit 208 updates keywords stored in its own data storage unit 204 based on the keywords received from the digital cameras 102 and 103.

When conditions have been received from two or more terminals, either one thereof is selectively adopted. Each of the digital cameras 102 and 103 has a priority. As described above, for example, a higher priority is assigned to a digital camera distributing the last image. Hereinafter, it is described that the digital camera 102 has a higher priority than the digital camera 103.

Figure 18:
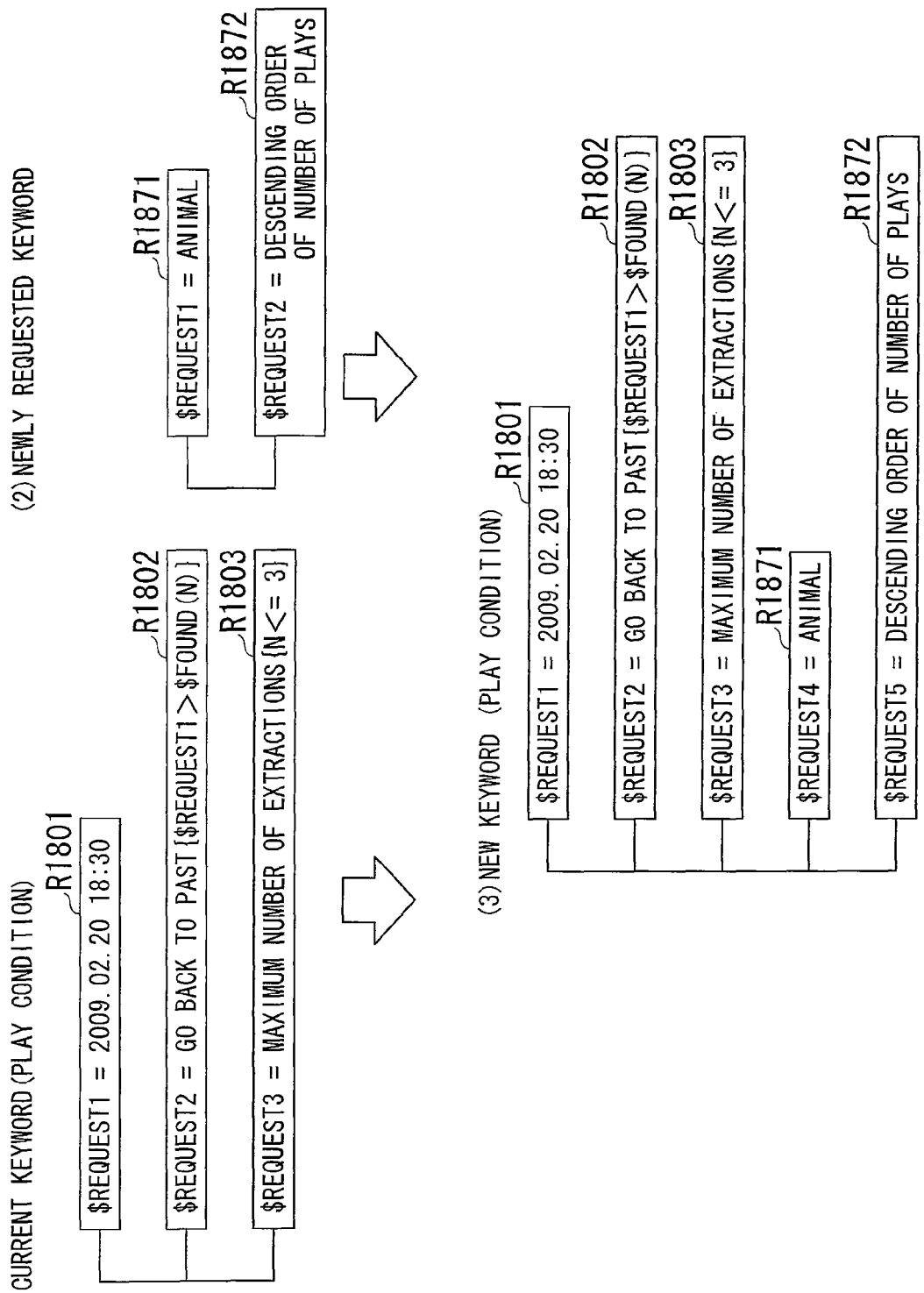
FIG. 18 is a reference diagram showing a keyword according to an embodiment.

FIG. 18 shows a current keyword before update, a keyword requested from the digital camera 102, and a new keyword after update. The current keyword stored in the data storage unit 204 of the digital camera 101 includes a condition R1801 of designating photographing time information and two conditions R1802 and R1803. The keyword requested from the digital camera 102 includes conditions R1871 and R1872 regarding tag information.

The keyword after update is a mixture of two keywords of the current keyword before update and the keyword requested from the digital camera 102. The newly generated keyword is transmitted from the digital camera 101 to the digital cameras 102 and 103. The digital cameras 102 and 103 extract a photo suitable for the keyword from among their own photos, and return response messages.

As a keyword update method, there is a method of not only adding a condition, but also inserting all current keywords into a received keyword or a method in which a limit number of keywords are provided, for example, as three keywords or less, and an old keyword is discarded when a new keyword has been received. In the above-described example, the number of keywords is counted as 1 in the conditions R1801, R1802, and R1803. That is, the keyword after update shown in FIG. 18 means a mixture of two keywords, but the count method is not limited thereto.

According to this embodiment as described above, since its own photo becomes a part of a selection target when a terminal having a master role selects the next photo to be played, it is possible to reflect a change of a situation for photo selection even though the situation change such as an increase or decrease of the number of its own photos occurs. Since a list of photos which are suitable for a keyword and are possessed by another terminal joining data sharing is received every time a photo is selected, it is possible to reflect a change of a situation for photo selection by reflecting the situation change in the list even though the situation change occurs such as a situation where another terminal newly joins data sharing, a situation where another terminal joining data sharing goes out of the data sharing, or a situation where the number of photos of another terminal joining data sharing is increased or decreased. Accordingly, data sharing reflecting a situation change may be implemented.

As illustrated in the first operation example, when a terminal having a slave role has received a distribution right transfer message from a terminal having a master role, a photo possessed by each terminal may be distributed by changing the role. As illustrated in the sixth operation example, when a terminal having a slave role has received a distribution instruction message from a terminal having a master role, a photo possessed by each terminal may be distributed by transmitting its own photo indicated by the distribution instruction message.

As illustrated in the first operation example, a photo inconsistent with the play condition intended by the user is not played by updating a keyword based on information attached to a just previously distributed photo in step S703 of FIG. 7.

As illustrated in the seventh operation example, a terminal having a master role generates a new keyword based on a keyword received from a terminal having a slave role, so that data sharing reflecting a condition requested by each terminal may be implemented.

That is, since electronic data stored in a storage unit becomes a selection target according to the present invention, it is possible to reflect a change of a situation for selection of electronic data by a selection unit even though the situation change occurs such as an increase or decrease of electronic data stored in its own storage unit. Since possession information to be used to select electronic data is received from another communication terminal, joining data sharing, between a first timing and a second timing when the electronic data is selected, it is possible to reflect a change of a situation for selection of electronic data by a selection unit even though the situation change occurs such as a situation where the number of other communication terminals joining data sharing is increased or decreased or a situation where electronic data possessed by other communication terminals joining data sharing is increased or decreased. Accordingly, data sharing reflecting a situation change may be implemented.

While the exemplary embodiments of the invention have been described with reference to the accompanying drawings, the detailed constitutions of the invention are not limited to the foregoing embodiments but embrace changes in design to the extent that they do not depart from the concept of the invention. For example, electronic data which becomes a data sharing target may not be a photo. The present invention is applicable to the case where various data such as video data or voice data is shared between terminals on a network.

What is claimed is:

1. A communication terminal comprising:
  a storage unit that stores contents, condition information deciding play order of the contents, and additional information of the contents;
  a communication unit that wirelessly transmits the condition information, which has been stored by the storage unit, to other communication terminals that joins a network, the communication unit wirelessly receiving additional information of contents, which have been stored by the other communication terminals, from the other communication terminals as a response of the condition information that has been wirelessly transmitted to the other communication terminals; and
  a selection unit that compares the additional information of the contents, which have been stored by the storage unit, with the additional information, which has been stored by the other communication terminals and wirelessly received by the communication unit, so as to select contents suitable for the condition information, which has been stored by the storage unit, from among the contents, which have been stored by the storage unit, and the contents, which have been stored by the other communication terminals, and wherein
  if the selection unit selects the contents that have been stored by the storage unit, then the communication unit wirelessly transmits the contents, which have been selected, to the other communication terminals, and
  if the selection unit selects the contents that have been stored by the other communication terminals, then the communication unit wirelessly transmits a message for wirelessly transmitting the contents, which have been selected, to the other communication terminals that stores the contents that have been selected.

2. The communication terminal according to claim 1, wherein the communication unit wirelessly transmits the contents, which have been stored by the storage unit, to the other communication terminals only when a distribution right of the contents is given.

3. The communication terminal according to claim 2, wherein the communication unit wirelessly transmits the condition information, which has been stored by the storage unit, to the other communication terminals only when the distribution right of the contents is given.

4. The communication terminal according to claim 2, further comprising:
  a distribution determination unit that determines to shift the distribution right to the other communication terminals that stores the contents, which have been selected, if the distribution right of the contents is given and the contents, which have been stored by the other communication terminals, are selected by the selection unit.

5. The communication terminal according to claim 2, further comprising:
  a distribution determination unit that determines not to shift the distribution right to the other communication terminals if the distribution right of the contents is given and the contents, which have been stored by the storage unit, are selected by the selection unit.

6. The communication terminal according to claim 2, further comprising:
  a distribution determination unit that determines that the distribution right is given if a prescribed declaration report is wirelessly transmitted to the other communication terminals and the prescribed declaration report from the other communication terminals is not received in a prescribed term after joining the network.

7. The communication terminal according to claim 2, further comprising:
  a distribution determination unit that determines that the distribution right is given if a prescribed declaration report is wirelessly transmitted to the other communication terminals and the prescribed declaration report is wirelessly received from the other communication terminals after joining the network and if a declaration time in accordance with a declaration report, which has been wirelessly received, is after the declaration time in accordance with the declaration report, which has been wirelessly transmitted.

8. The communication terminal according to claim 2, wherein the communication unit transmits the contents, which have been stored by the storage unit, to the other communication terminals by multicast.

9. The communication terminal according to claim 1, further comprising:
  a display unit that displays the contents that have been wirelessly transmitted by the communication unit.

10. The communication terminal according to claim 1, wherein the communication unit wirelessly receives the contents, which have been wirelessly transmitted from one of the other communication terminals that is a wireless transmission destination of the message.

11. The communication terminal according to claim 10, wherein the communication unit wirelessly receives the contents, which have been wirelessly transmitted by the other communication terminals, by multicast.

12. The communication terminal according to claim 10, further comprising:
  a display unit that displays the contents that have been wirelessly received by the communication unit.

13. The communication terminal according to claim 1, wherein
the communication unit wirelessly receives the condition information and the contents, which have been stored by the other communication terminals, from the other communication terminals,
the selection unit retrieves the contents suitable for the condition information, which has been wirelessly received, from the contents that is stored by the storage unit, and
if the selection unit retrieves the contents suitable for the condition information that has been wirelessly received, then the communication unit wirelessly transmits the additional information of the contents, which have been retrieved by the selection unit, to the other communication terminals as a response of the condition information that has been wirelessly received.

14. The communication terminal according to claim 13, wherein
the communication unit wirelessly receives a message for wirelessly transmitting the contents, which have been stored by the storage unit, from the other communication terminals that is a wireless transmission destination of the additional information, and
the communication unit wirelessly transmits the contents, which have been stored by the storage unit, to the other communication terminals after the message is wirelessly received.

15. The communication terminal according to claim 13, wherein the communication unit wirelessly receives the condition information from the other communication terminals by multicast.

16. The communication terminal according to claim 13, wherein
only when a distribution right of the contents is given, the communication unit wirelessly transmits the contents, which have been stored by the storage unit, to the other communication terminals, and
only when the distribution right is not given, if the communication unit wirelessly receives the condition information and the contents, which have been stored by the other communication terminals, from the other communication terminals, and the selection unit retrieves the contents suitable for the condition information, then the communication unit wirelessly transmits the additional information of the contents, which have been retrieved by the selection unit, to the other communication terminals as a response to the condition information, which has been wirelessly received.

17. The communication terminal according to claim 1, wherein
the communication unit wirelessly transmits the contents, which have been stored by the storage unit, to the other communication terminals only when a distribution right of the contents is given, and
the communication unit wirelessly transmits the condition information, which has been stored by the storage unit, to the other communication terminals regardless of whether the distribution right is given or not.

18. The communication terminal according to claim 1, wherein the communication unit wirelessly transmits the condition information, which has been stored by the storage unit, to the other communication terminals by multicast.

19. The communication terminal according to claim 1, further comprising:
an update unit that updates the condition information based on the additional information of the contents, which have been stored by the other communication terminals and wirelessly received by the communication unit.

20. The communication terminal according to claim 1, further comprising:
an update unit that updates the condition information that has been stored in the storage unit, wherein
the communication unit wirelessly receives the condition information from the other communication terminals, and
the update unit updates the condition information, which has been stored in the storage unit, based on the condition information that has been wirelessly received by the communication unit.

21. The communication terminal according to claim 1, wherein
the other communication terminals distribute the contents only when the distribution right is given, and
the communication unit wirelessly transmits, as the message, a message for giving the distribution right to the other communication terminals, which store the contents that have been selected.

22. The communication terminal according to claim 1, wherein
the communication unit wirelessly transmits a distribution instruction message for distributing the contents, which have been stored by the other communication terminals, to the other communication terminals that store the contents that have been selected.

23. The communication terminal according to any one of claims 6 to 22, wherein the contents are image data.

24. A communication terminal comprising:
a storage unit that stores contents and additional information of the contents;
a communication unit that wirelessly receives condition information for deciding a play order of the contents and the contents, which have been stored by other communication terminals, from the other communication terminals that join a network;
a play unit that plays the contents that have been wirelessly received by the communication unit; and
a selection unit that retrieves the contents suitable for the condition information, which has been wirelessly received, from the contents that have been stored by the storage unit, wherein
if the selection unit retrieves the contents suitable for the condition information that has been wirelessly received, then the communication unit wirelessly transmits the additional information of the contents, which have been retrieved by the selection unit, to the other communication terminals as a response to the condition information that has been wirelessly received.

25. The communication terminal according to claim 24, wherein the communication unit wirelessly receives a message for wirelessly transmitting the contents, which have been stored by the storage unit, from the other communication terminals that are a wireless transmission destination of the additional information.

26. The communication terminal according to claim 24, wherein the communication unit receives the condition information from the other communication terminals by multicast.

27. The communication terminal according to claim 24, wherein
only when a distribution right of the contents is given, the communication unit wirelessly transmits the contents, which have been stored by the storage unit, to the other communication terminals, and only when the distribution right is not given, if the communication unit wirelessly receives the condition information and the contents, which have been stored by the other communication terminals, from the other communication terminals, and the selection unit retrieves the contents suitable for the condition information, then the communication unit wirelessly transmits the additional information of the contents, which have been retrieved by the selection unit, to the other communication terminals as a response to the condition information, which has been wirelessly received.

28. A communication method by a communication terminal comprising:

a transmission step of wirelessly transmitting condition information deciding play order of contents to other communication terminals joining a network;

a reception step of wirelessly receiving additional information of the contents, which have been stored by the other communication terminals, from the other communication terminals as a response to the condition information, which has been wirelessly transmitted in the transmission step;

a selection unit step of comparing the additional information of the contents, which have been stored, with the additional information of the contents, which has been wirelessly received in the reception step, so as to select contents suitable for the condition information, which has been transmitted in the transmission step, from among the contents, which have been stored, and the contents, which have been stored by the other communication terminals; and an instruction step of wirelessly transmitting a message for wirelessly transmitting the contents, which have been selected, to the other communication terminals, which store the contents that have been selected, if the contents, which have been stored by the other communication terminals, are selected in the selection step.

* * * * *